(12) United States Patent
Furukawa

(10) Patent No.: US 8,572,383 B2
(45) Date of Patent: Oct. 29, 2013

(54) KEY EXCHANGE DEVICE, KEY EXCHANGE PROCESSING SYSTEM, KEY EXCHANGE METHOD, AND PROGRAM

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 759 days.

(21) Appl. No.: 12/526,981

(22) PCT Filed: Feb. 14, 2008

(86) PCT No.: PCT/JP2008/052427
§ 371 (c)(1),
(2), (4) Date: Aug. 13, 2009

(87) PCT Pub. No.: WO2008/099875
PCT Pub. Date: Aug. 21, 2008

(65) Prior Publication Data
US 2010/0070768 A1    Mar. 18, 2010

(30) Foreign Application Priority Data

Feb. 15, 2007    (JP) ................... 2007-035112

(51) Int. Cl.
*H04L 9/12*    (2006.01)
(52) U.S. Cl.
USPC ............ 713/171; 713/168; 713/169; 713/170
(58) Field of Classification Search
None
See application file for complete search history.

(56) References Cited

U.S. PATENT DOCUMENTS 5,825,890 A * 10/1998 Elgamal et al. ............... 713/151
7,096,494 B1 * 8/2006 Chen .................................. 726/9

FOREIGN PATENT DOCUMENTS

| JP | 4-117826 A | 4/1992 |
| JP | 11-289326 A | 10/1999 |
| JP | 2006018439 A | 1/2006 |
| WO | 0156223 A | 8/2001 |

OTHER PUBLICATIONS

Dutta et al., Pairing-Based Cryptography: A Survey, Cryptology ePrint Archive: Report 2004/064, Jun. 2004.*
International Search Report for PCT/JP2008/052427 mailed May 13, 2008.
M. D. Raimondo et al., "Deniable Authentication and Key Exchange", 13th ACM Conference on Computaer and Communication Security, Oct. 30-Nov. 3, 2006, p. 400-409.
T. Ito et al., "Anonymous Traceable Key Agreement using Pairing over Elliptic Curve". Computer Security Symposium 2004, IPSJ Symposium Series vol. 2004, No. 11, Oct. 20-22, 2004.
Yuh-Min Tseng, et al, "A mutual authentication and key exchange scheme from bilinear pairings for low power computing devices", 31st Annual International Computer Software and Applications Conference (COMPSAC 2007), 2007.

* cited by examiner

Primary Examiner — Minh Dinh

(57) ABSTRACT

A key exchange apparatus according to the present invention includes storage 250 and arithmetic controller 260 and performs a key exchange process with an external companion apparatus through a network, as follows: When arithmetic controller 260 is supplied with a random number, a private key, an own public key, a companion public key, an initial session number, and a start command, the arithmetic controller generates a starter message including a first session number and a first hash value, and sends the starter message to the companion apparatus. When the arithmetic controller receives a responder message including a second session number and a third hash value from the companion apparatus, if a generated fourth hash value and the third hash value are in agreement with each other, the arithmetic controller generates and stores a fifth hash value as a key in storage 250.

8 Claims, 20 Drawing Sheets

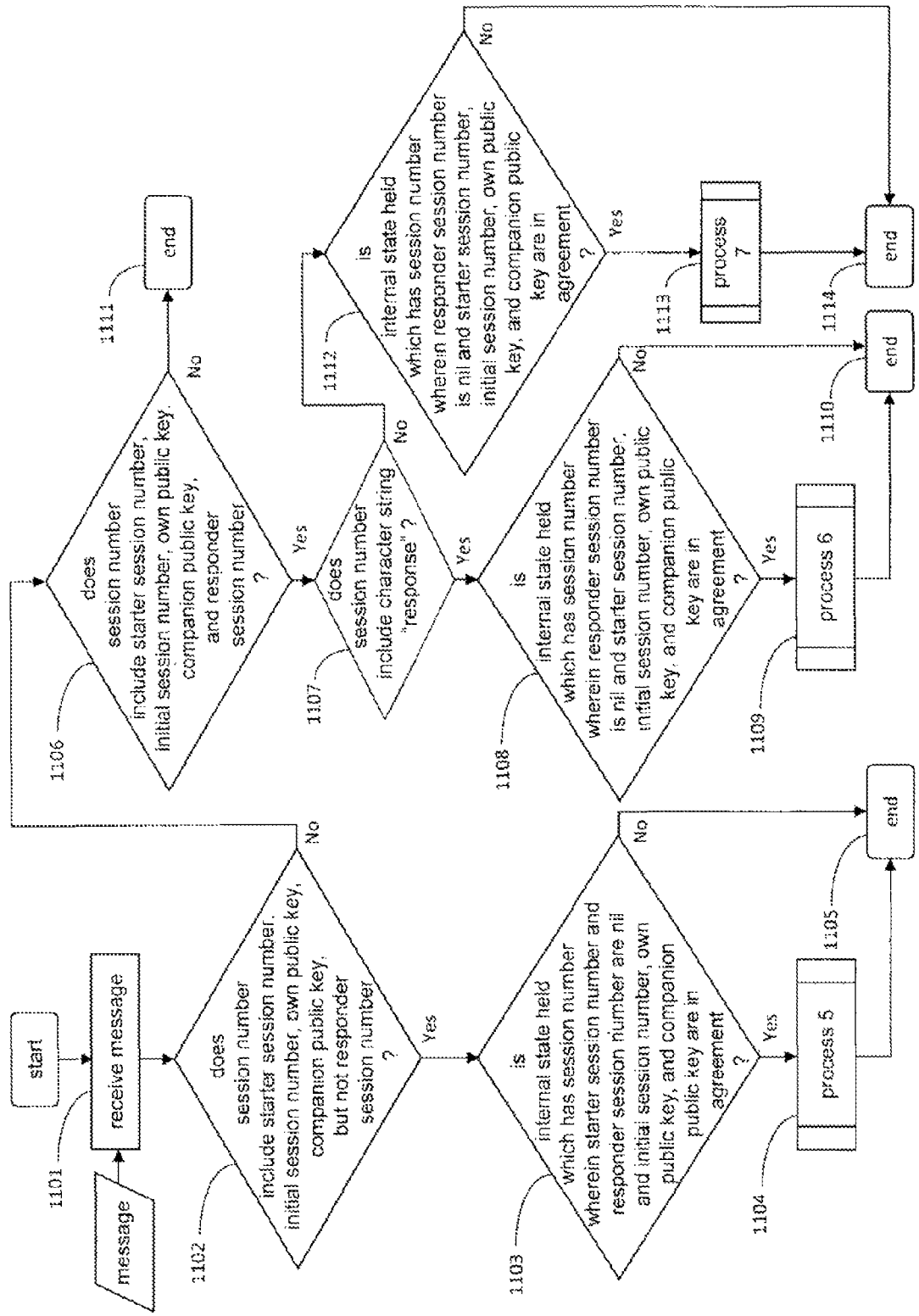

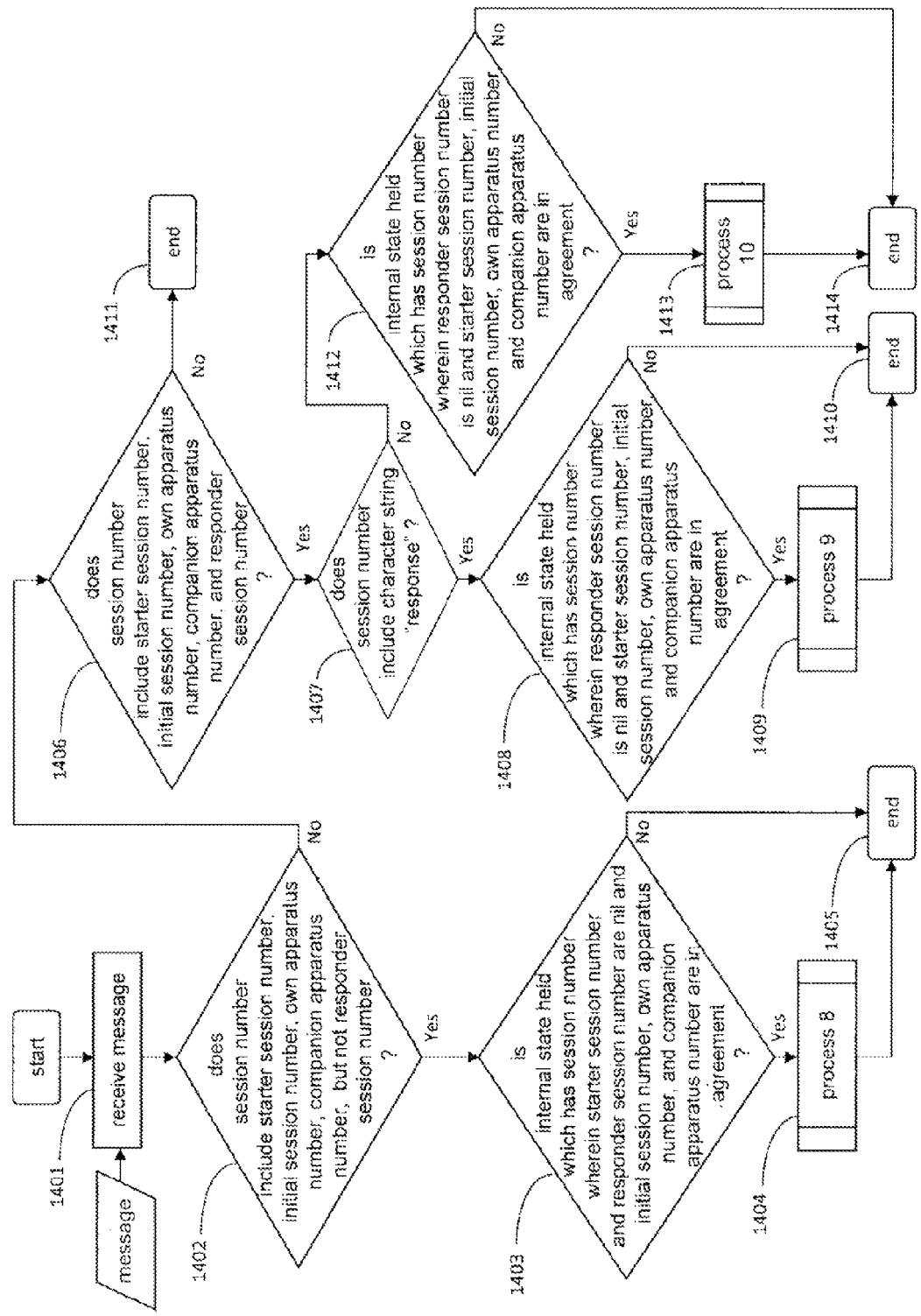

KEY EXCHANGE DEVICE, KEY EXCHANGE PROCESSING SYSTEM, KEY EXCHANGE METHOD, AND PROGRAM

This application is the National Phase of PCT/JP2008/052427, filed Feb. 14, 2008, which is based upon and claims the benefit of priority from Japanese Patent Application No. 2007-035112 filed on Feb. 15, 2007, the content of which is incorporated by reference.

TECHNICAL FIELD

The present invention relates to a key exchange apparatus for communicating with another apparatus to share one key and performing deniable communications such that the result of communications carried out for both apparatus to authenticate each other communicative party and exchange keys does not represent communicative certification, a key exchange processing system, a key exchange method, and a program for enabling a computer to carry out the key exchange method.

BACKGROUND ART

Two apparatus that take part in a key exchange system communicate with each other to share one key. A system wherein each apparatus has a process of authenticating itself and authenticates a companion apparatus with which the apparatus has exchanged a key is called an authentication and key exchange system. If communications performed between the two apparatus to exchange keys do not certify that the apparatus have communicated with each other, then the system is called a deniable authentication and key exchange system.

One example of relevant deniable authentication and key exchange system is disclosed in the document: Mario Di Raimondo, Rosario Gennaro, and Hugo Krawczyk, "Deniable Authentication and Key Exchange", 13th ACM Conference on Computer and Communication Security. A summary of the relevant deniable authentication and key exchange system will be described below.

FIG. 1 is a diagram illustrative of the relevant deniable authentication and key exchange system.

As shown in FIG. 1, two key exchange apparatus A.107, B.108 for exchanging keys are communicably connected to each other. Key exchange apparatus A.107 will hereinafter be simply referred to as "apparatus A" and key exchange apparatus B.108 as "apparatus B".

Apparatus A is supplied with private key 101 of its own, public key 103 of apparatus B, and random number 113. Apparatus B is supplied with private key 104 of its own, public key 102 of device A, and random number 114. It is assumed that private key 101 is denoted by skA, private key 104 by skB, public key 102 by pkA, and public key 103 by pkB, and also that random number 113 is denoted by rA and random number 114 by rB.

Each of apparatus A, B incorporates therein an encrypting device and a decrypting device according to the public-key cryptography. The keys such as pkA, skA, etc. are public keys and private keys that are used according to the public-key cryptography with which apparatus A, B are compatible. Each of the apparatus additionally incorporates an authenticating device and a pseudo-random number generator.

It is assumed that p represents a prime number and g a generating element of a subgroup of prime number order q of $(Z/pZ)^*$. These p, q are sufficiently large. Initially, apparatus A starts communications. This will not lose generality.

An operating sequence of apparatus A and apparatus B will briefly be described below.

Apparatus A randomly selects $x \in Z/qZ$ and key kA of the authenticating device. Apparatus A then generates $hA=g^x$ and cryptotext cA based on pkB of kA, and sends them to apparatus B (as indicated by reference numeral 115 in FIG. 1).

Apparatus B randomly selects $y \in Z/qZ$ and key kB of the authenticating device. Apparatus B then generates $hB=g^y$ and cryptotext cB based on pkA of kB. When apparatus B receives $hA=g^x$ and cA from apparatus A, apparatus B decrypts cA using skB. The decrypted result is represented by kA'. Then, apparatus B generates authentication code tB for hA, hB using kA'. Thereafter, apparatus B sends hB, cB, and tB to apparatus A (as indicated by reference numeral 116 in FIG. 1).

When apparatus A receives hb, cB, and tB from apparatus B, apparatus A verifies authentication code tB for hA, hB using kA. If the authenticated result is not correct, then the sequence stops. If the authenticated result is correct, then apparatus A decrypts cB using skA. The decrypted result is represented by kB'.

Then, apparatus A generates authentication code tA for hA, hB using kB'. Apparatus A generates pseudo-random number qA from $hB^x$ with the pseudo-random number generator, using kA as a key, and also generates pseudo-random number qB' from $hB^x$ with the pseudo-random number generator, using kB' as a key. Apparatus A then outputs exchanged key 110 as the result of an exclusive OR on qA and qB' per bit. Finally, apparatus A sends tA to apparatus B (as indicated by reference numeral 117 in FIG. 1).

When apparatus B receives tA from apparatus A, apparatus B verifies authentication code tA for hA, hB using kB. If the authenticated result is not correct, then the sequence stops.

If the authenticated result is correct, then apparatus B generates pseudo-random number qA' from $hA^y$ with the pseudo-random number generator, using kA' as a key, and also generates pseudo-random number qB from $hA^y$ with the pseudo-random number generator, using kB as a key. Finally, apparatus B outputs exchanged key 111 as the result of an exclusive OR on qA' and qB per bit.

Apparatus A possibly outputs a knowledge obtained as a result of the communication with apparatus B as history 109. Apparatus B possibly outputs a knowledge obtained as a result of the communication with apparatus A as history 112.

DISCLOSURE OF THE INVENTION

The above deniable authentication and key exchange system is required to perform three communication sessions, between apparatus A and apparatus B. As the number of communication sessions increases, each apparatus has to wait longer for a response from the companion apparatus, resulting in a reduction in the execution rate. Therefore, it is preferable that the number of communication sessions be smaller.

Each apparatus has an encrypting device and a decrypting device, and needs to send a cryptotext generated by the encrypting device. The encrypting device has to carry out calculations under large loads, which tend to lower the execution rate of the key exchange process. The cryptotext has a large amount of data which is liable to increase the communication traffic between the apparatus.

Each apparatus is required to obtain in advance a public key of the companion party with which to exchange keys. If a plurality of apparatus which carry out the key exchange process do not carry public keys of companion parties, then each of the apparatus needs to perform additional communication sessions. If apparatus A is not given the public key of apparatus B and apparatus A is to start a key exchange process, then apparatus A needs to receive in advance public key pkB from apparatus B. In this case, another communication session is required in addition to the three communication sessions described above.

As described above, the relevant deniable authentication and key exchange system has suffered large loads in arithmetic and communication processing operations.

It is an object of the present invention to provide a key exchange apparatus, a key exchange processing system, a key exchange method, and a program for enabling a computer to carry out the key exchange method, which suffer a reduced load in a key exchange process.

A key exchange apparatus according to the present invention includes a storage and an arithmetic controller, for performing a key exchange process with an external companion apparatus through a network, wherein when the arithmetic controller is supplied with a random number, a private key, an own public key which is the public key of its own apparatus, a companion public key which is the public key of the companion apparatus, an initial session number, and a start command, the arithmetic controller generates a first session number including the initial session number, a starter session number which is different from the initial session number, the own public key, and the companion public key, generates a first hash value using information of the first session number, the random number, and the private key, and sends a starter message including the first session number and the first hash value to the companion apparatus; when the arithmetic controller receives the starter message from the companion apparatus, the arithmetic controller determines whether a second hash value generated using the information of the first session number and the first hash value are in agreement with each other or not based on a property of a bilinear mapping, and if the hash values are in agreement with each other, the arithmetic controller generates a responder session number which is different from any one of the initial session number and the starter session number, generates a third hash value using information of a second session number that is generated by adding the responder session number to the first session number, stores the third hash value as a key in the storage, generates a responder message including the second session number and the third hash value, and sends the responder message to the companion apparatus; and when the arithmetic controller receives the responder message from the companion apparatus, the arithmetic controller determines whether a fourth hash value generated using the information of the second session number and the third hash value are in agreement with each other or not based on a property of a bilinear mapping, and if the hash values are in agreement with each other, the arithmetic controller generates a fifth hash value using the information of the second session number, and stores the fifth hash value as a key in the storage.

A key exchange apparatus according to the present invention includes a storage and an arithmetic controller, for performing a key exchange process with an external companion apparatus through a network, wherein when the arithmetic controller is supplied with a random number, a private key, an own apparatus number which is the identifier of its own apparatus, a companion apparatus number which is the identifier key of the companion apparatus, an initial session number, and a start command, the arithmetic controller generates a first session number including the initial session number, a starter session number which is different from the initial session number, the own apparatus number, and the companion apparatus number, generates a first cryptotext using information of the first session number and the random number, generates a first hash value using the information of the first session number and the private key, and sends a starter message including the first session number, the first cryptotext, and the first hash value to the companion apparatus; when the arithmetic controller receives the starter message from the companion apparatus, the arithmetic controller decrypts the first cryptotext using the information of the first session number and the private key, generates a second hash value including the decrypted result, determines whether the second hash value and the first hash value are in agreement with each other or not based on a property of a bilinear mapping, and if the hash values are in agreement with each other, the arithmetic controller generates a responder session number which is different from any one of the initial session number and the starter session number, generates a second session number by adding the responder session number to the first session number, generates a second cryptotext using information of the second session number and the random number, generates a third hash value including the information of the second session number and the private key, stores the third hash value as a key in the storage, and sends a responder message including the second session number, the second cryptotext, and the third hash value to the companion apparatus; and when the arithmetic controller receives the responder message from the companion apparatus, the arithmetic controller decrypts the second cryptotext using the information of the second session number and the private key, generates a fourth hash value including the decrypted result, determines whether the fourth hash value and the third hash value are in agreement with each other or not based on a property of a bilinear mapping, and if the hash values are in agreement with each other, the arithmetic controller generates a fifth hash value including the information of the second session number and the private key, and stores the fifth hash value as a key in the storage.

According to the present invention, since only two communication sessions are sufficient, i.e., a message sent from a starter of the key exchange process to a responder and a message sent from the responder to the starter, the key exchange apparatus is subject to lower communication process loads than with the background art. Furthermore, inasmuch as the sources of the messages can be authenticated using the property of the bilinear mapping, a communication history of authentication data is not left unlike the background art.

BRIEF DESCRIPTION OF THE DRAWINGS

FIG. 11 is a flowchart of an operation sequence of a key exchange responding section according to a third exemplary embodiment;

FIG. 14 is a flowchart of an operation sequence of a key exchange responding section according to a fourth exemplary embodiment;

Figure 1:
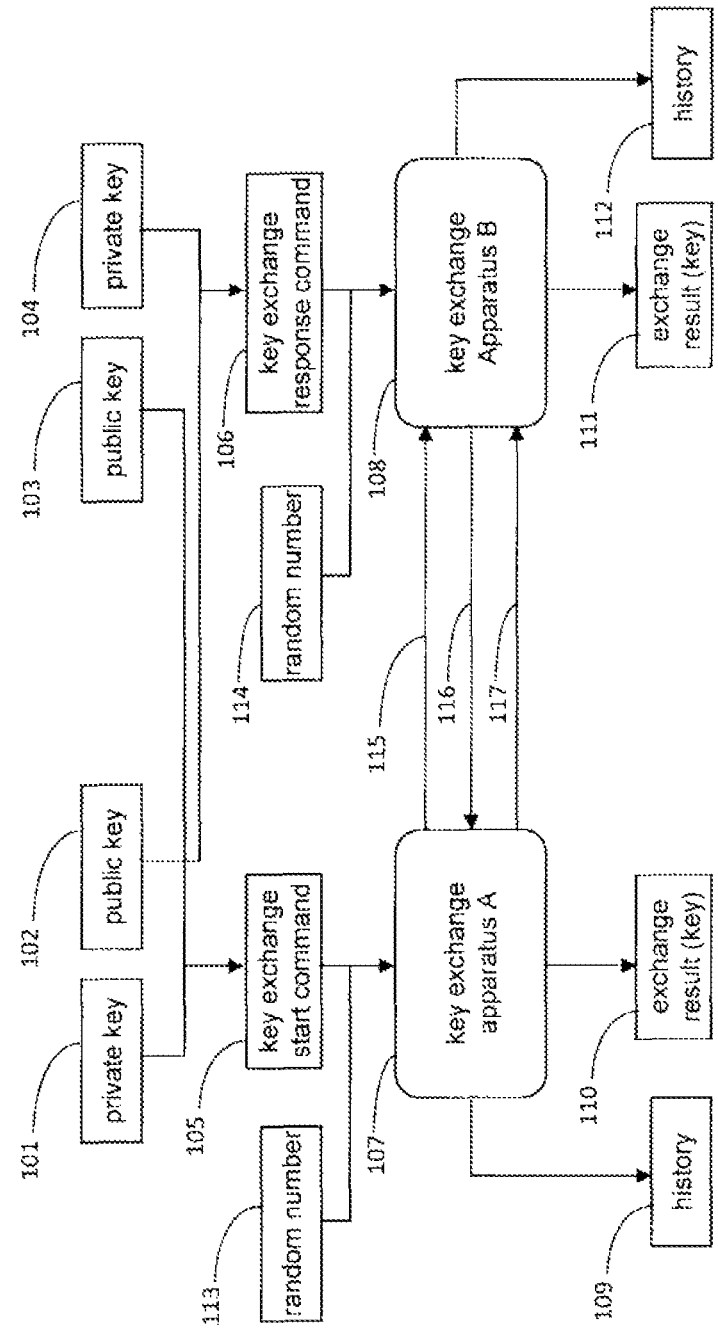
FIG. 1 is a diagram illustrative of a relevant deniable authentication and key exchange system.

DESCRIPTION OF REFERENCE NUMERALS 200, 700 key exchange apparatus
250, 750 storage
260, 760 arithmetic controller

BEST MODE FOR CARRYING OUT THE INVENTION

In each exemplary embodiment, it is assumed that q represents a prime number, G, G' multiplicative cyclic groups of order q, and e a bilinear mapping for mapping two elements of G onto elements of G'. That e is bilinear means that arbitrary elements u, v of G and arbitrary elements a, b of Z/qZ satisfy $e(u^a, v^b) = e(u,v)^{ab}$.

It is also assumed that g represents a generating element of G and Hash a hash function. It is also assumed that a key exchange apparatus according to each exemplary embodiment has functions as a device for field arithmetic operations on a bilinear mapping e in groups G, G', a device for field arithmetic operations on group arithmetic device Z/qZ, and an arithmetic device for the hash function. In the exemplary embodiments to be described below, the functions as the arithmetic devices are provided in an arithmetic controller. The results of arithmetic processing operations are temporarily stored in a storage.

The key exchange apparatus according to each exemplary embodiment holds generating element g. It is assumed that Hash is referred to as a hash function whose value range is represented by Z/qZ, Hash' as a hash function whose value range is represented by Z, and Hash" as a hash function whose value range is represented by the space of an exchange key. $\phi$ indicates that corresponding data are nil. Words that are indicated by quotation marks are handled as character string data.

1st Exemplary Embodiment

The configuration of a key exchange apparatus according to the present exemplary embodiment will be described below.

Figure 2:
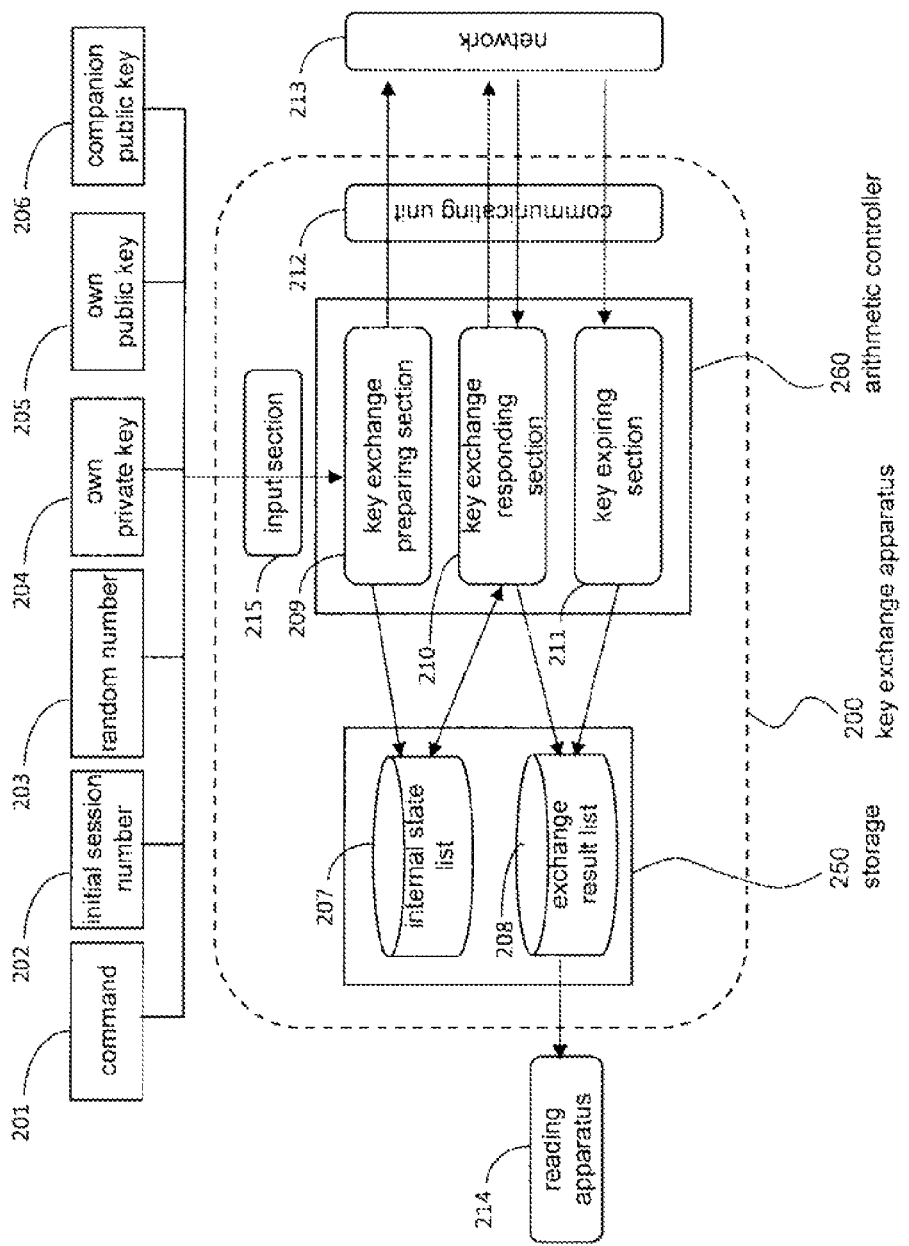
FIG. 2 is a block diagram showing a configurational example of a key exchange apparatus according to a first exemplary embodiment.

FIG. 2 is a block diagram showing a configurational example of a key exchange apparatus according to the present exemplary embodiment.

As shown in FIG. 2, key exchange apparatus 200 comprises input section 215 for being supplied with various data, communicating section 212 for communicating with external apparatus through network 213, storage 250 for storing supplied data, and arithmetic controller 260. Key exchange apparatus 200 is connected to another key exchange apparatus through network 213, and performs a key exchange process. The companion key exchange apparatus is of a configuration identical to key exchange apparatus 200 shown in FIG. 2.

The private key of its own apparatus is referred to as an own private key, and the public key of its own apparatus as an own public key. The public key of the companion apparatus with which to perform the key exchange process is referred to as a companion public key.

Storage 250 includes internal state list 207 for storing internal state information which represents information indicative of the state of a processing process in the key exchange process, and exchange result list 208 for storing an exchange result which represents information of a key generated in the key exchange process.

Arithmetic controller 260 comprises key exchange preparing section 209, key exchange responding section 210, and key expiring section 211. Arithmetic controller 260 has a CPU (Central Processing Unit) (not shown) for executing predetermined processes according to a program and a memory (not shown) for storing the program. When arithmetic controller 260 executes the program, key exchange preparing section 209, key exchange responding section 210, and key expiring section 211 are virtually constructed in the key exchange apparatus.

Key exchange preparing section 209 and key exchange responding section 210 generate data referred to as internal state information during the key exchange process, write the generated data in internal state list 207 of storage 250, read the internal state information from internal state list 207, and erase the internal state information from internal state list 207. Key exchange responding section 210 writes the data of a generated key as an exchange result in exchange result list 208 of storage 250. Key expiring section 211 erases the exchange result from exchange result list 208.

Each of the internal state information and the exchange result is identified by a session number serving as an identifier, and registered together with the session number in the storage. Each of the internal state information and the exchange result is thus managed by its session number.

Session numbers are available in types including an initial session number which serves as a basic identifier, a starter session number which serves as an identifier of a starter of the key exchange process, a responder session number which serves as an identifier of a companion as a responder, and a session number which is newly generated by these session numbers. Each of the internal state information and the exchange result is managed by a newly generated session number.

A newly generated session number includes a starter session number, a responder session number, an initial session number, an own public key of the entity which has generated the session number, a companion public key, and the information of a label of character string data. The generated session number is expressed as (starter session number, responder session number, initial session number, own public key, companion public key, and label of character string data).

When key exchange preparing section 209, key exchange responding section 210, and key expiring section 211 are supplied with data through input section 707 or receive a message through communicating section 212, they access the internal state information or the exchange result in storage 250 according to the content of the data or the message, and carries on the key exchange process.

The message includes a companion public key representing a transmission destination, an own public key representing a transmission source, a session number, and a hash value. The message is expressed as (companion public key, own public key, session number, and hash value). Key exchange apparatus 200 can identify the transmission source of the message with the information of the companion public key in the message.

The session number includes information representative of the companion apparatus. Since the internal state information indicative of an interim state of a key exchange process in progress is managed by the session number, key exchange apparatus 200 can manage the progress of a key exchange process per companion apparatus even if a plurality of companion apparatus are involved in key exchange processes, and hence can perform a plurality of key exchange processes concurrently.

An exchange key that is stored as an exchange result in storage 250 is read by reading apparatus 214, and used by an external application.

Operation of the key exchange apparatus according to the present exemplary embodiment will be described in detail below.

Figure 3:
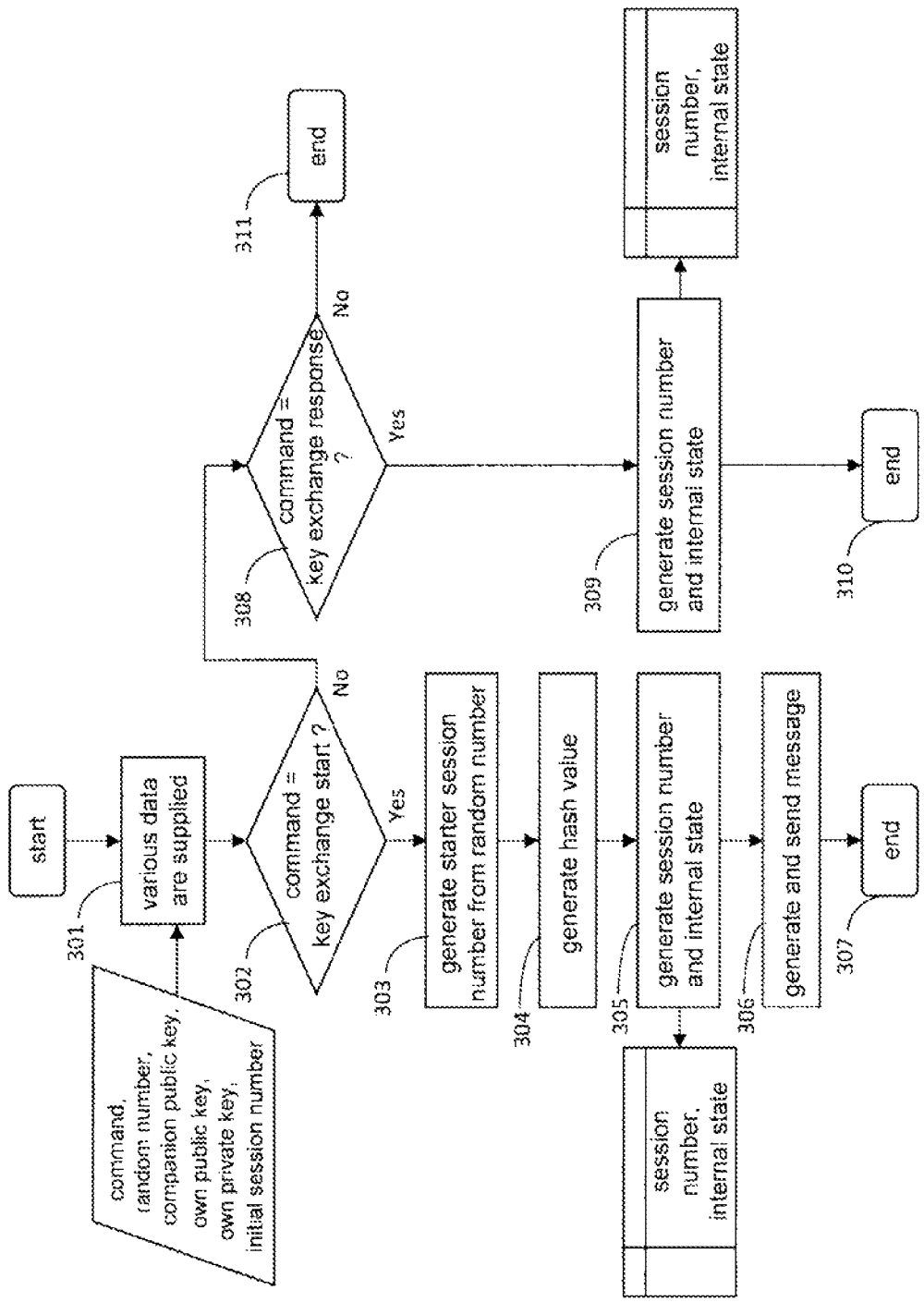
FIG. 3 is a flowchart of an operation sequence of a key exchange preparing section according to the first exemplary embodiment.

FIG. 3 is a flowchart of an operation sequence of the key exchange preparing section. As shown in FIG. 3, key exchange preparing section 209 of key exchange apparatus 200 is supplied with command 201, initial session number 202, random number 203, own private key 204, own public key 205, and companion public key 206 shown in FIG. 2 through input section 215 (step 301). It is assumed that initial session number 202 is represented by $sid_C$, own private key 204 by $x \in Z/qZ$, own public key 205 by $y=g^x$, and companion public key 206 by y'.

Key exchange preparing section 209 determines whether command 201 indicates "key exchange start" or not (step 302). If command 201 indicates "key exchange start", then key exchange preparing section 209 operates as follows:

1. It generates $r \in Z/qZ$ from random number 203 (step 303).

2. It generates starter session number $sid_I = g^r$ (step 303).

3. It generates hash value $H=Hash(sid_I, sid_C, y, y', y'^r, y^x,$ "start") (step 304).

4. It generates session number SID as $SID=(sid_I, \phi, sid_C, y, y',$ "start") (step 305).

5. It stores r as indicative of internal state information corresponding to the session number determined by above operation 4, in internal state list 207 of storage 205 (step 305).

6. It sends message (y', y, SID, H) to the companion key exchange apparatus with public key y' through communicating section 212 and network 213 (step 306).

7. It puts an end to the operation sequence, and is in a standby condition waiting for next input data or received data (step 307).

If command 201 does not indicate "key exchange start" in step 302 shown in FIG. 3, then key exchange preparing section 209 determines whether command 201 indicates "key exchange response" or not (step 308). If command 201 indicates "key exchange response", then key exchange preparing section 209 operates as follows:

1. It generates session number SID as $SID=(\phi, \phi, sid_C, y, y',$ "response") (step 309). In this session number, the starter session number and the responder session number are nil.

2. It stores $\phi$ as indicative of internal state information corresponding to the session number determined by above operation 1, in internal state list 207 of storage 250 (step 309).

3. It puts an end to the operation sequence, and is in a standby condition waiting for next input data or received data (step 310).

It operates similarly if command 201 does not indicate "key exchange response" in step 308.

As described above, key exchange preparing section 209 carries out steps 303 through 306 if it is a starter, and carries out step 309 if the companion is a starter and it is a responder.

Figure 4:
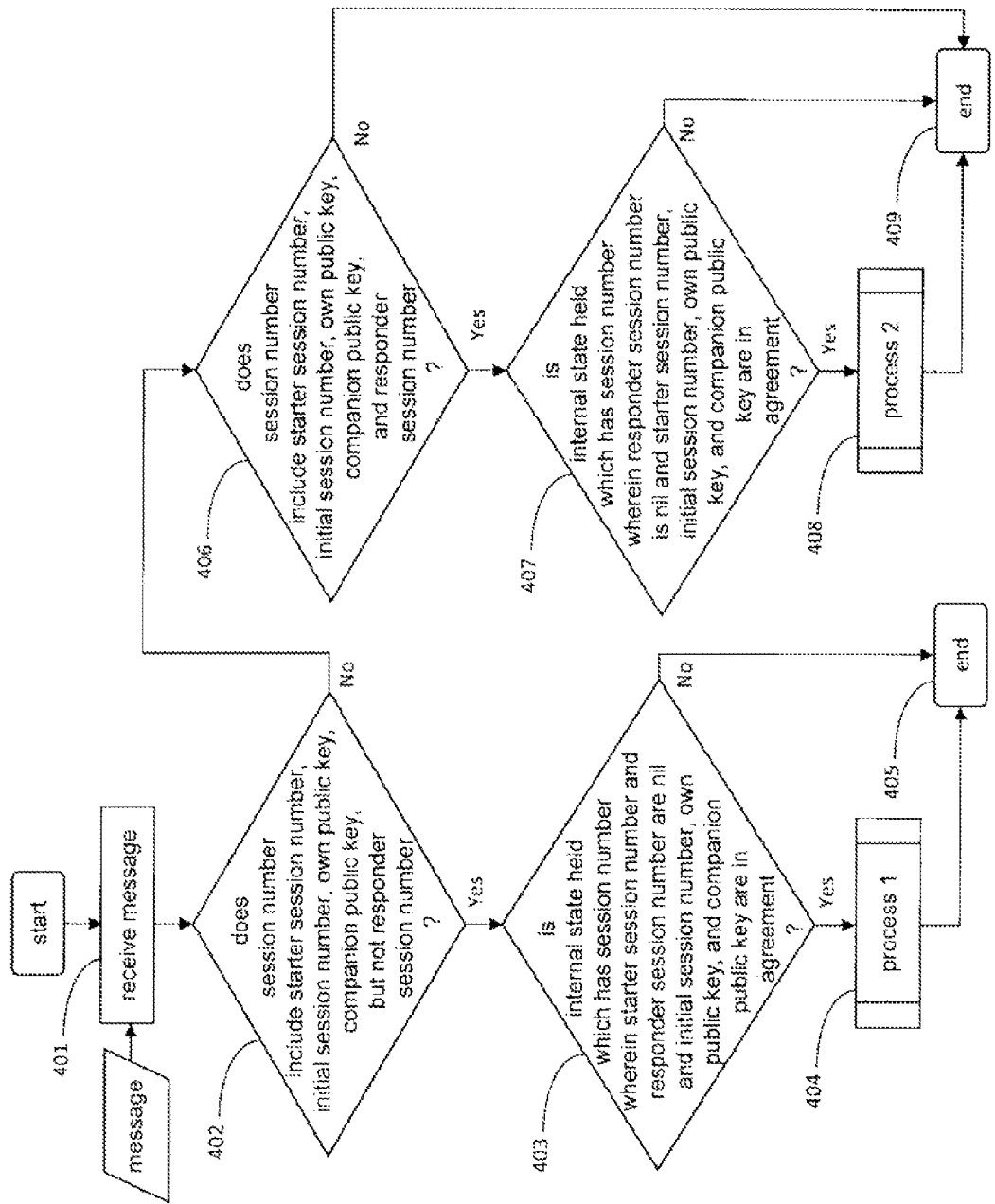
FIG. 4 is a flowchart of an operation sequence of a key exchange responding section according to the first exemplary embodiment.
Figure 5A:
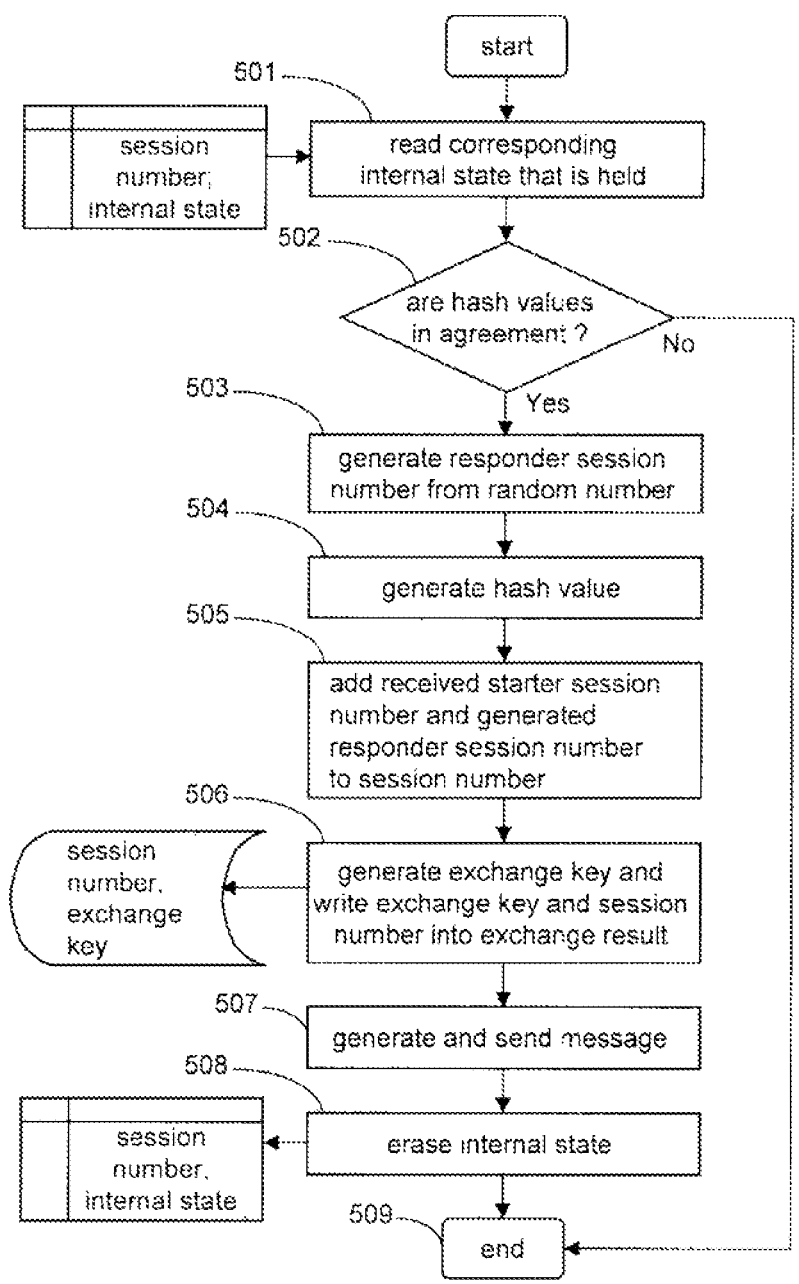
FIG. 5A is a flowchart of an operation sequence of each of process 1 and process 2 shown in FIG. 4.
Figure 5B:
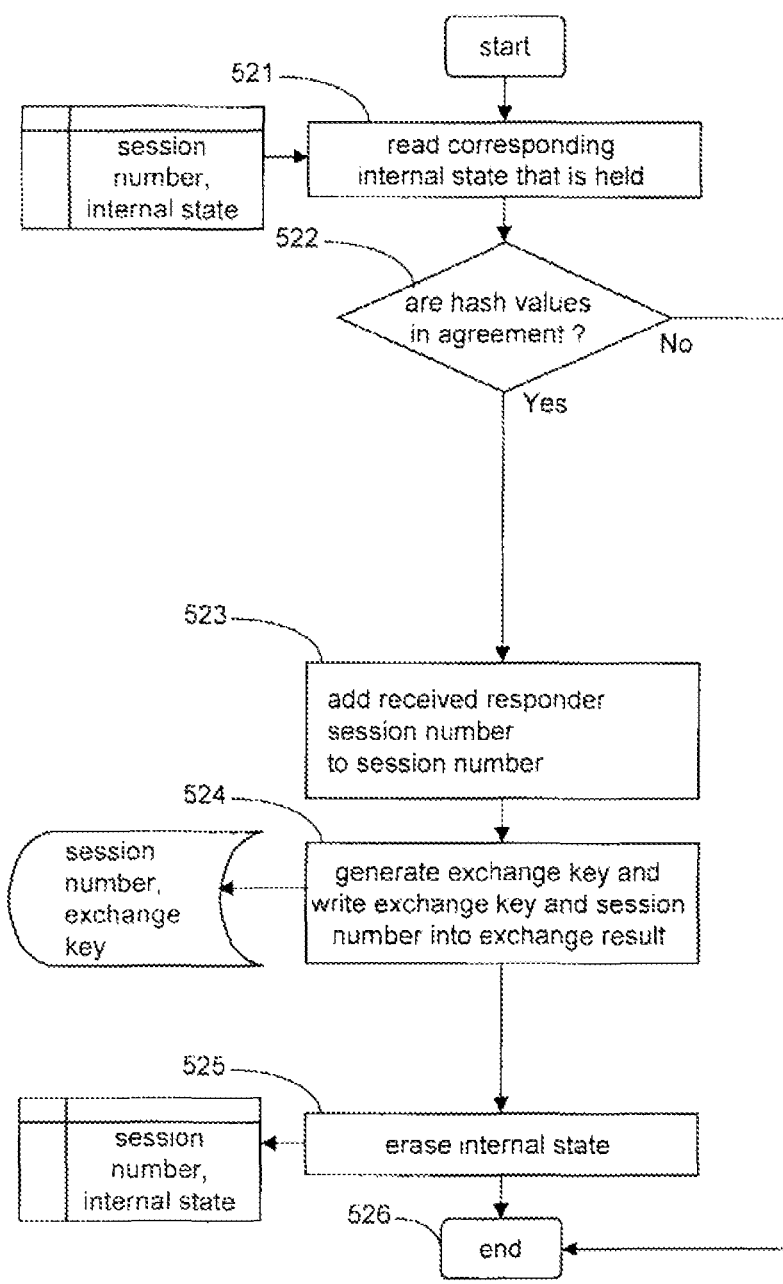
FIG. 5B is a flowchart of an operation sequence of each of process 1 and process 2 shown in FIG. 4.

Then, operation of key exchange responding section 210 will be described below. FIG. 4 is a flowchart of an operation sequence of the key exchange responding section. FIG. 5A is a flowchart of an operation sequence of process 1 shown in FIG. 4, and FIG. 5B is a flowchart of an operation sequence of process 2 shown in FIG. 4.

The operation sequence of key exchange responding section 210 includes an operation sequence when it receives a message from the companion while it is a responder and the companion is a starter and an operation sequence when it receives a message from the companion while it is a starter and the companion is a responder. These operation sequences will be described successively.

Key exchange responding section 210 of key exchange apparatus 200 receives message (y, y', SID', H') from the companion key exchange apparatus through network 213 and communicating section 212 (step 401). Key exchange responding section 210 then determines whether session number SID' is of format $SID'=(sid_I, \phi, sid_C, y', y,$ "start") or not (step 402).

Message (y, y', SID', H') has been generated by the companion key exchange apparatus having public key y' in the same manner as the process described with reference to FIG. 3. The session number and the hash value which are included in this message are indicated respectively by SID' and H'.

If the answer to step 402 is Yes, then key exchange responding section 210 acts as a responder and operates as follows:

1. It confirms that the destination to which the message is sent is in agreement with public key y of its own apparatus. If not in agreement, then it puts an end to the operation sequence, and is in a standby condition waiting for next input data or received data.

2. It checks if the internal state information corresponding to session number SID ($\phi, \phi, sid_C, y, y',$ "response") is present in internal state list 207 of storage 250 or not (step 403). If the processing of step 309 described with reference to FIG. 3 has been carried out, then the internal state information has been stored in internal state list 207. If the internal state information corresponding to the session number is not present, then it puts an end to the operation sequence, and is in a standby condition waiting for next input data or received data (step 405).

If the internal state information is present in step 403, then control goes to the flowchart shown in FIG. 5A, and key exchange responding section 210 operates as follows:

3. It reads corresponding internal state information $\phi$ that is stored (step 501). It sets $h'=sid_I$, then reads H' included in the received message, and confirms that $H'=Hash(sid_I, sid_C, y', y, h'^x, y'^x,$ "start") is satisfied (step 502) where $h'^x$ represents the result of an arithmetic operation on the starter session number and the own private key and $y'^x$ the result of an arithmetic operation on the companion public key and the own private key. If the above equation is not satisfied, then key exchange responding section 210 puts an end to the operation sequence, and is in a standby condition waiting for next input data or received data (step 509).

4. It generates $r \in Z/qZ$ from a random number (step 503).

5. It generates responder session number $sid_R = g^r$ (step 503).

6. It generates hash value $H = Hash(sid_I, sid_R, sid_C, y, y', h^{r'}, h^{rx}, y^{r'}, \text{"response"})$ (step 504) where $h^{r'}$ represents the result of an arithmetic operation on the random number used to generate the responder session number and the starter session number and $y^{r'}$ the result of an arithmetic operation on the random number used to generate the responder session number and the companion public key.

7. It adds the received starter session number and the generated responder session number to session number $SID = (\phi, \phi, sid_C, y, y', \text{"response"})$, and updates session number SID into $SID = (sid_I, sid_R, sid_C, y, y', \text{"response"})$ (step 505).

8. It generates exchange key $K = Hash(sid_I, sid_R, sid_C, y', y, h^{r'}, h^{rx}, y^{r'}, \text{"key"})$ (step 506).

9. It stores K as indicative of an exchange result corresponding to the session number updated in above operation 7, in exchange result list 208 of storage 250 (step 506).

10. It sends message (y', y, SID, H) to the companion key exchange apparatus having public key y' through communicating section 212 and network 213 (step 507).

11. It erases internal state information $\phi$ corresponding to the session number updated in above operation 7, from internal state list 207 of storage 250 (step 508).

12. It puts an end to the operation sequence, and is in a standby condition waiting for next input data or received data (step 509).

If the answer to step 402 is No, then key exchange responding section 210 reads session number SID' of received message (y, y', SID', H') and checks if it is of format $SID' = (sid_I, sid_R, sid_C, y', y, \text{"response"})$ or not (step 406). If it is of format $SID' = (sid_I, sid_R, sid_C, y', y, \text{"response"})$, then key exchange responding section 210 judges that it has received a response message from the companion key exchange apparatus in response to a message that key exchange preparing section 209 has sent, as a starter, to the companion key exchange apparatus, and operates as follows:

1. It confirms that the destination to which the message is sent is in agreement with public key y of its own apparatus. If not in agreement, then it puts an end to the operation sequence, and is in a standby condition waiting for next input data or received data.

2. It checks if the internal state information corresponding to session number $SID (sid_I, \phi, sid_C, y, y', \text{"start"})$ is present in internal state list 207 of storage 250 or not (step 407). If the processing of step 305 described with reference to FIG. 3 has been carried out, then the internal state information has been stored in internal state list 207. If the internal state information corresponding to the session number is not present, then it puts an end to the operation sequence, and is in a standby condition waiting for next input data or received data (step 409).

If the internal state information is present in step 407, then control goes to the flowchart shown in FIG. 5B, and key exchange responding section 210 operates as follows:

3. It reads corresponding internal state information r that is stored (step 521). It sets $h' = sid_R$, then reads H' from the received message, and confirms that $H' = Hash(sid_I, sid_R, sid_C, y', y, h^{r'}, y^{rx}, h^{rx}, \text{"response"})$ is satisfied (step 522). If the above equation is not satisfied, then key exchange responding section 210 is in a standby condition waiting for next input data or received data (step 526).

4. It adds the received responder session number to session number $SID = (sid_I, \phi, sid_C, y, y', \text{"start"})$ and updates session number SID into $SID = (sid_I, sid_R, sid_C, y, y', \text{"start"})$ (step 523).

5. It generates exchange key $K = Hash(sid_I, sid_R, sid_C, y, y', h^{r'}, y^{r'}, h^{rx}, \text{"key"})$ (step 524).

6. It stores K as indicative of an exchange result corresponding to the session number updated in above operation 4, in exchange result list 208 of storage 250 (step 524).

7. It erases internal state information r corresponding to the session number updated in above operation 4, from internal state list 207 of storage 250 (step 525).

8. It puts an end to the operation sequence, and is in a standby condition waiting for next input data or received data (step 526).

If the key generated as described above becomes no longer necessary, the key is expired in the manner described below. A command for expiring the key may be entered through the input section 215 or received through network 213 and communicating section 212.

Figure 6:
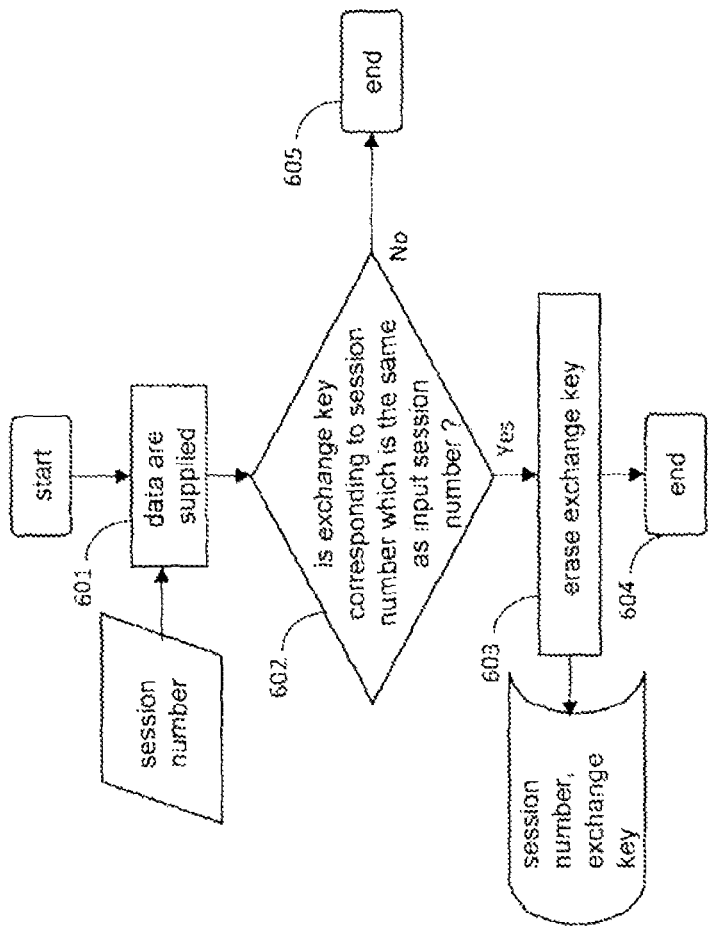
FIG. 6 is a flowchart of an operation sequence of a key expiring section according to the first exemplary embodiment.

FIG. 6 is a flowchart of an operation sequence of the key expiring section. When key expiring section 211 of key exchange apparatus 200 is supplied with a key expiring command and session number SID for identifying a key to be expired (step 601), it operates as follows:

1. It determines whether the exchange result of a session number which is in agreement with session number SID is held in exchange result list 208 of storage 250 or not (step 602). If the corresponding exchange result is held, then the exchange result and session number SID are erased (step 603).

2. It puts an end to the operation sequence, and is in a standby condition waiting for next input data or received data (step 604).

When the key exchange apparatus according to the present exemplary embodiment exchanges messages with another key exchange apparatus for a key exchange process, it may have only two communication sessions regardless of whether it is a starter or a responder.

In the key exchange process using the key exchange apparatus according to the present invention, the arguments of a hash function calculated by one of the key exchange apparatus include values $h^{r'}, y^{rx}, h^{rx}$. These values are equal to $h^{r'}, y^{x'}, y^{r'}$, respectively. The former values can be calculated by the key exchange apparatus corresponding to public key y, whereas the latter values can be calculated by the key exchange apparatus corresponding to public key y'. In other words, they can be calculated with the knowledge of either one of (r, x) and (r', x').

It can be ascertained whether certain values a, b, c are equal to $h^{r'}, y^{rx}, h^{rx}$ or not by confirming $e(a, g) = e(h, h'), e(b, g) = e(y, y'), e(c, g) = e(y, h')$, with the knowledge of either one of (r, x) and (r', x') though the knowledge of the other is not available. This means that if a certain apparatus is capable of correctly calculating a hash function, then it is possible to confirm by observing a specific process for the apparatus to calculate the hash function whether values corresponding to a, b, c are read and the specific process is calculating the value of a hash function that is sought in a key exchange process.

For determining a denial possibility in a conventional key exchange process between apparatus A and apparatus B, insofar as apparatus A behaves honestly, apparatus A is unable to obtain evidence showing that apparatus B has exchanged keys with apparatus A even though apparatus B also carries on a normal process. If apparatus B behaves honestly even though apparatus A behaves dishonestly, then apparatus A is able to obtain evidence showing that apparatus B has exchanged keys with apparatus A.

According to the present exemplary embodiment, it can be checked if apparatus A is carrying out a honest (i.e., normal) process or not by extracting values which may possibly correspond to values a, b, c and confirming whether e(a, g)=e(h, h'), e(b, g)=e(y, y'), e(c, g)=e(y, h'). Thus, apparatus B can behave without being deceived by apparatus A. It can be seen that a key exchange method according to the present exemplary embodiment has a denial possibility.

2nd Exemplary Embodiment

The configuration of a key exchange apparatus according to the present exemplary embodiment will be described below.

Figure 7:
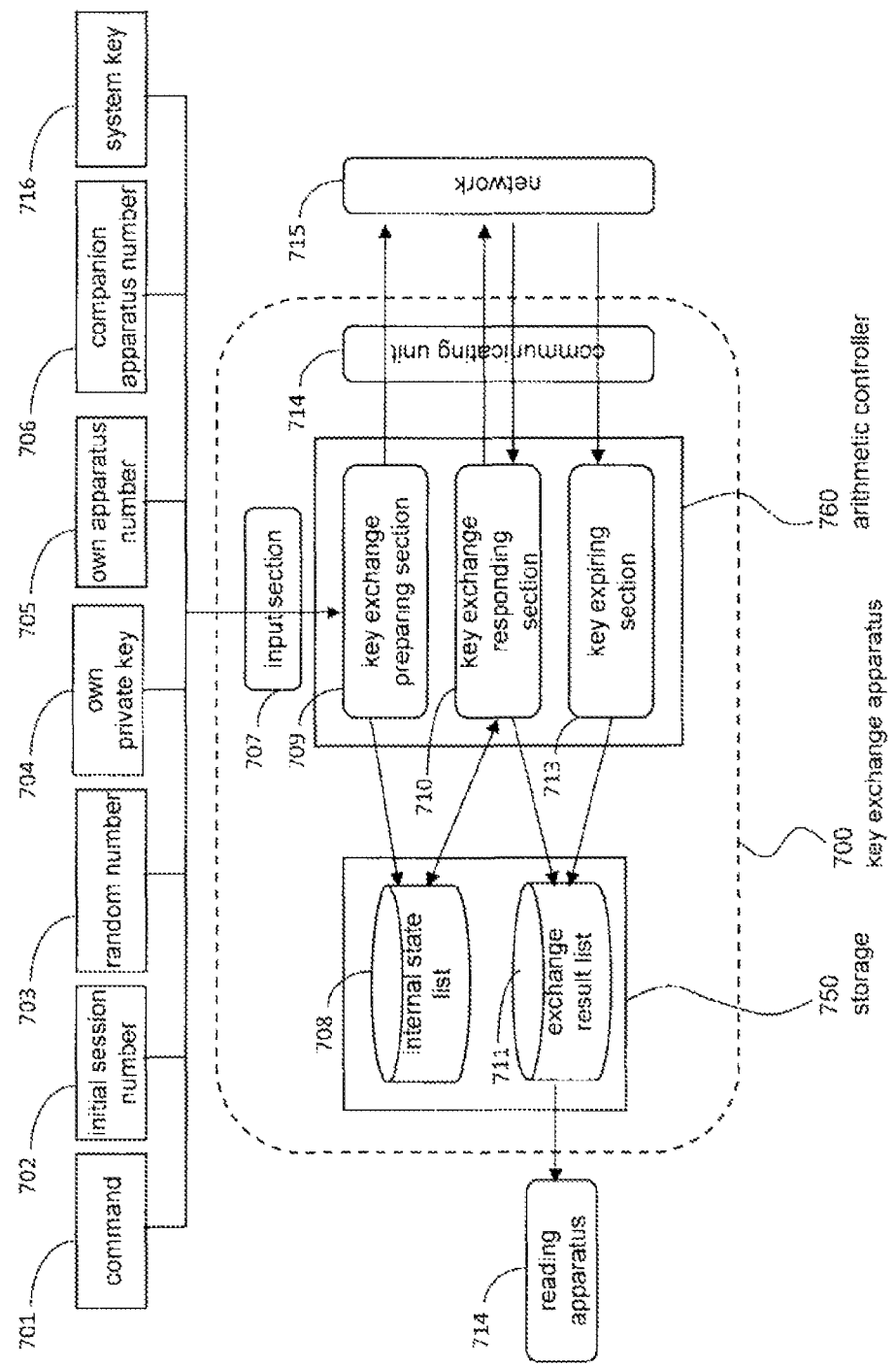
FIG. 7 is a block diagram showing a configurational example of a key exchange apparatus according to a second exemplary embodiment.

FIG. 7 is a block diagram showing a configurational example of a key exchange apparatus according to the present exemplary embodiment.

As shown in FIG. 7, key exchange apparatus 700 comprises input section 707 for being supplied with various data, communicating section 714 for communicating with external apparatus through network 715, storage 750 for storing supplied data, and arithmetic controller 760. Key exchange apparatus 700 is connected to another key exchange apparatus through network 715, and performs a key exchange process. The companion key exchange apparatus is of a configuration identical to key exchange apparatus 700 shown in FIG. 7.

An apparatus number, which serves as an identifier, is assigned to each key exchange apparatus. An apparatus number may be a character string such as a mail address and url (uniform resource locators) inherent in an apparatus or the like, or may be something else. The apparatus number of its own apparatus is referred to as an own apparatus number, and the apparatus number of the companion apparatus with which to perform the key exchange process is referred to as a companion apparatus number.

Storage 750 includes internal state list 708 for storing internal state information which represents information indicative of the state of a processing process in the key exchange process, and exchange result list 711 for storing an exchange result which represents information of a key generated in the key exchange process.

Arithmetic controller 760 comprises key exchange preparing section 709, key exchange responding section 710, and key expiring section 713. Arithmetic controller 760 has a CPU (not shown) for executing predetermined processes according to a program and a memory (not shown) for storing the program. When arithmetic controller 760 executes the program, key exchange preparing section 709, key exchange responding section 710, and key expiring section 713 are virtually constructed in the key exchange apparatus.

Key exchange preparing section 709 and key exchange responding section 710 generate data referred to as internal state information during the key exchange process, write the generated data in internal state list 708 of storage 750, read the internal state information from internal state list 708, and erase the internal state information from internal state list 708. Key exchange responding section 710 writes the data of a generated key as an exchange result in exchange result list 711 of storage 750. Key expiring section 713 erases the exchange result from exchange result list 711.

Each of the internal state information and the exchange result is identified by a session number serving as an identifier, and registered together with the session number in the storage. Each of the internal state information and the exchange result is thus managed by its session number.

Session numbers are available in types including an initial session number which serves as a basic identifier, a starter session number which serves as an identifier of a starter of the key exchange process, a responder session number which serves as an identifier of a companion as a responder, and a session number which is newly generated by these session numbers. Each of the internal state information and the exchange result is managed by a newly generated session number.

A newly generated session number includes a starter session number, a responder session number, an initial session number, an own apparatus number, a companion apparatus number, and the information of a label of character string data. The generated session number is expressed as (starter session number, responder session number, initial session number, own apparatus number, companion apparatus number, and label of character string data).

When key exchange preparing section 709, key exchange responding section 710, and key expiring section 713 are supplied with data through input section 707 or receive a message through communicating section 714, they access the internal state information or the exchange result in storage 750 according to the content of the data or the message, and carries on the key exchange process.

The message includes a companion apparatus number representing a transmission destination, an own apparatus number representing a transmission source, a session number, a cryptotext, and a hash value. The message is expressed as (companion apparatus number, own apparatus number, session number, and (cryptotext, hash value)). The key exchange apparatus can identify the transmission source of the message with the companion apparatus number in the message.

The session number includes information representative of the companion apparatus. Since the internal state information indicative of an interim state of a key exchange process in progress is managed by the session number, key exchange apparatus 700 can manage the progress of a key exchange process per companion apparatus even if a plurality of companion apparatus are involved in key exchange processes, and hence can perform a plurality of key exchange processes concurrently.

An exchange key that is stored as an exchange result in storage 750 is read by reading apparatus 712, and used by an external application.

Operation of the key exchange apparatus according to the present exemplary embodiment will be described in detail below.

Figure 8:
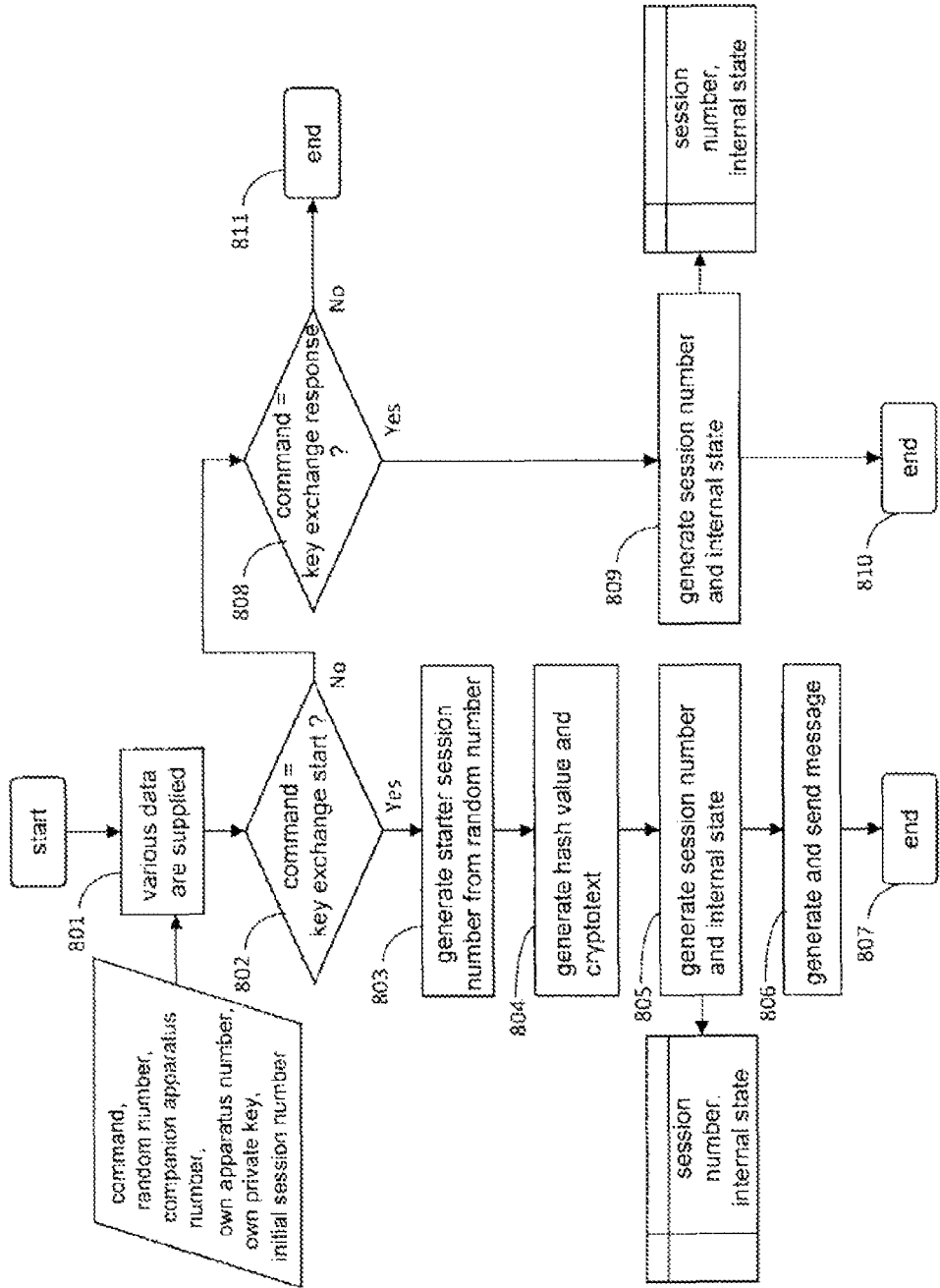
FIG. 8 is a flowchart of an operation sequence of a key exchange responding section according to the second exemplary embodiment.

FIG. 8 is a flowchart of an operation sequence of the key exchange preparing section. As shown in FIG. 8, key exchange preparing section 709 of key exchange apparatus 700 is supplied with command 701, initial session number 702, random number 703, own private key 704, own apparatus number 705, companion apparatus number 706, and system key 716 shown in FIG. 7 through input section 707 (step 801). It is assumed that initial session number 702 is represented by $sid_C$, own private key 704 by $x \in G$, own apparatus number 705 by id, companion apparatus number 706 by id', and system key 716 by $m \in G$.

Key exchange preparing section 709 determines whether command 701 indicates "key exchange start" or not (step 802). If command 701 indicates "key exchange start", then key exchange preparing section 709 operates as follows: It is assumed that if s satisfies $m=g^S$, then $x=Hash(g, m, id)^S$.

1. It generates $r \in Z/qZ$ from a random number (step 803).
2. It generates starter session number $sid_I=g^r$ (step 803).

3. It generates, as a hash value and a cryptotext:
y'=Hash'(g, m, id'),
u=Hast'($sid_I$, $sid_C$, id, id', e(y$^r$, y'), "start"),
c=Hash(u)+r,
H=Hash($sid_I$, $sid_C$, id, id', u, e(y' x), "start") (step 804).

4. It generates session number SID as SID=($sid_I$, id, id', "start") (step 805).

5. It stores u as indicative of internal state information corresponding to the session number determined by above operation 4, in internal state list 708 of storage 705 (step 805).

6. It sends message (id', id, SID, (c, H)) to the companion key exchange apparatus with apparatus number id' through communicating section 714 and network 715 (step 806).

7. It puts an end to the operation sequence, and is in a standby condition waiting for next input data or received data (step 807).

If command 701 does not indicate "key exchange start" in step 802 shown in FIG. 8, then key exchange preparing section 709 determines whether command 701 indicates "key exchange response" or not (step 808). If command 701 indicates "key exchange response", then key exchange preparing section 709 operates as follows:

1. It generates session number SID as SID=($\phi$, $\phi$, $sid_C$, id, id', "response") (step 809).

2. It stores $\phi$ as indicative of internal state information corresponding to the session number determined by above operation 1, in internal state list 708 of storage 750 (step 809).

3. It puts an end to the operation sequence, and is in a standby condition waiting for next input data or received data (step 810). It operates similarly if command 701 does not indicate "key exchange response" in step 808.

As described above, key exchange preparing section 709 carries out steps 803 through 806 if it is a starter, and carries out step 809 if the companion is a starter and it is a responder.

Figure 9:
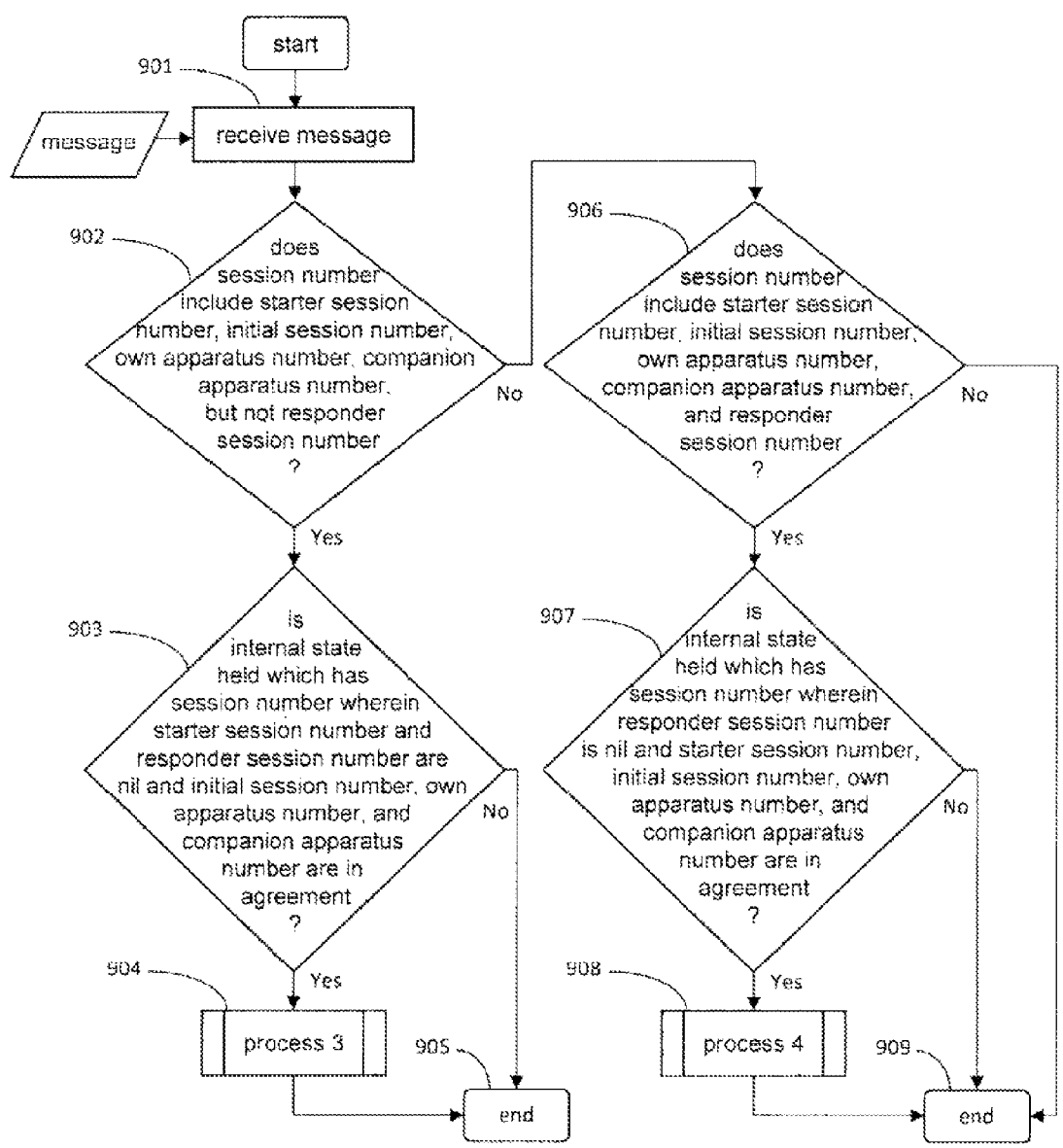
FIG. 9 is a flowchart of an operation sequence of a key exchange responding section according to the second exemplary embodiment.
Figure 10A:
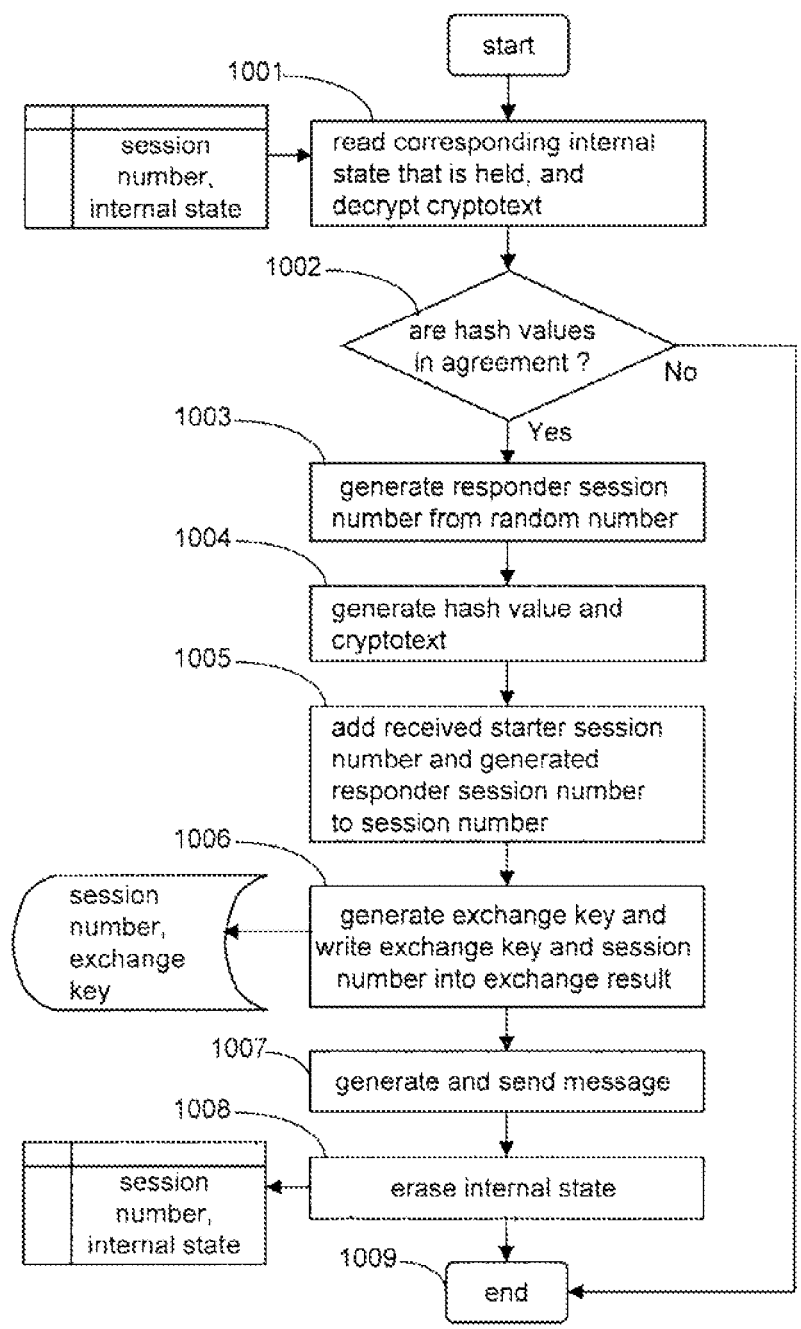
FIG. 10A is a flowchart of an operation sequence of process 3 shown in FIG. 9.
Figure 10B:
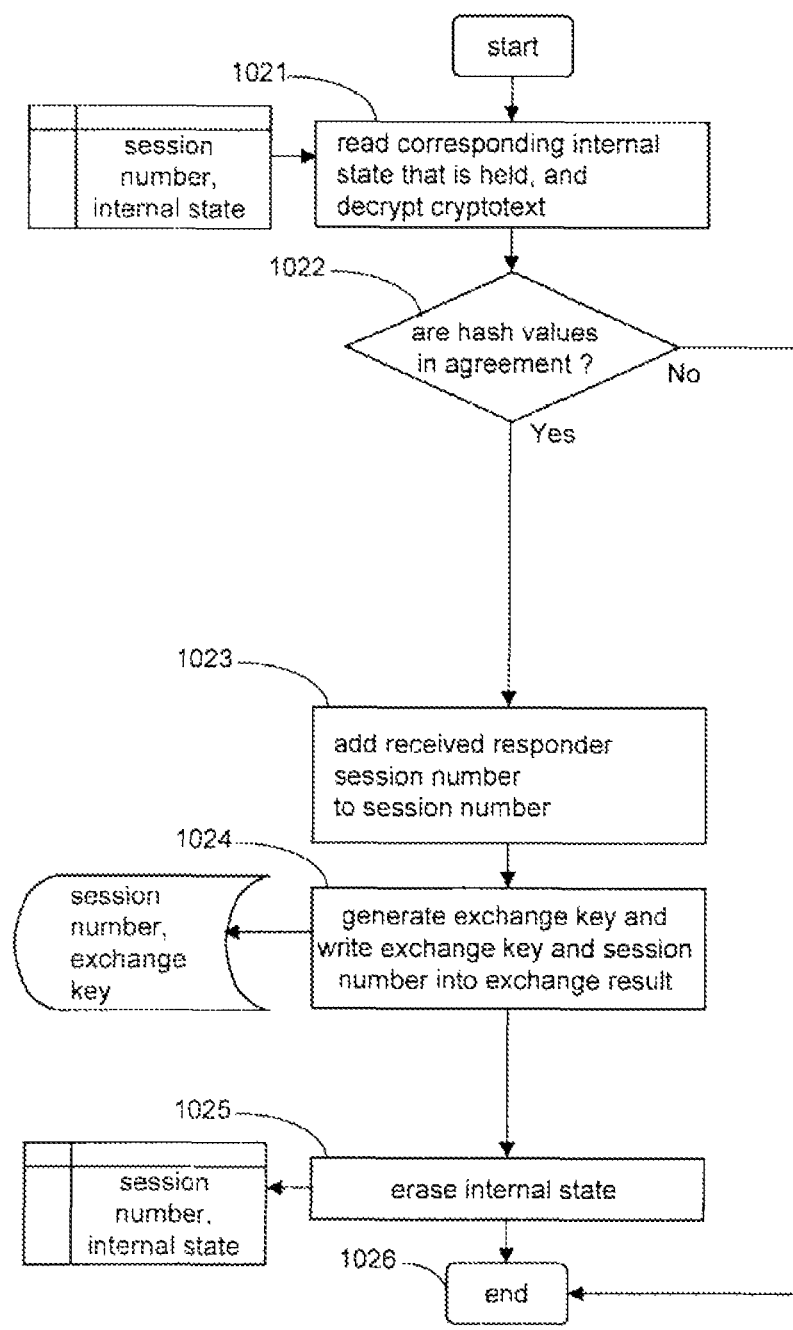
FIG. 10B is a flowchart of an operation sequence of process 4 shown in FIG. 9.

Then, operation of key exchange responding section 710 will be described below. FIG. 9 is a flowchart of an operation sequence of the key exchange responding section. FIG. 10A is a flowchart of an operation sequence of process 3 shown in FIG. 9, and FIG. 10B is a flowchart of an operation sequence of process 4 shown in FIG. 9.

The operation sequence of key exchange responding section 710 includes an operation sequence when it receives a message from the companion while it is a responder and the companion is a starter and an operation sequence when it receives a message from the companion while it is a starter and the companion is a responder. These operation sequences will be described successively.

Key exchange responding section 710 of key exchange apparatus 700 receives message (id, id', SID', (c', H')) from the companion key exchange apparatus through network 715 and communicating section 714 (step 901). Key exchange responding section 710 then determines whether session number SID' is of format SID'=($sid_I$, $\phi$, $sid_C$, id', id, "start") or not (step 902).

Message (id, id', SID', (c', H')) has been generated by the companion key exchange apparatus having apparatus number id' in the same manner as the process described with reference to FIG. 8. The session number, the cryptotext, and the hash value which are included in this message are indicated respectively by SID', c', and H'.

If the answer to step 902 is Yes, then key exchange responding section 710 acts as a responder and operates as follows:

1. It confirms that the destination to which the message is sent is in agreement with number id of its own apparatus. If not in agreement, then it puts an end to the operation sequence, waiting for next input data or received data.

2. It checks if the internal state information corresponding to session number SID ($\phi$, $\phi$, $sid_C$, id, id', "response") is present in internal state list 708 of storage 750 or not (step 903). If the processing of step 809 described with reference to FIG. 8 has been carried out, then the internal state information has been stored in internal state list 708. If the internal state information corresponding to the session number is not present, then it puts an end to the operation sequence, and is in a standby condition waiting for next input data or received data (step 905).

If the internal state information is present in step 903, then control goes to the flowchart shown in FIG. 10A, and key exchange responding section 710 operates as follows:

3. It reads corresponding internal state information $\phi$ that is stored (step 1001). It sets y'=Hash(g, m, id'), h'=$sid_I$, and then generates
u'=Hash'($sid_I$, $sid_C$, id', id, e(h', x), "start"), and
r'=c'Hash(u'), thereby decrypting the cryptotext (step 1001). Then, it confirms that h'=g$^r$, H'=Hash($sid_I$, $sid_C$, id', id, u', e(x, y'), "start") is satisfied (step 1002). If the above equation is not satisfied, then key exchange responding section 710 puts an end to the operation sequence, and is in a standby condition waiting for next input data or received data (step 1009).

4. It generates r ∈ Z/qZ from a random number (step 1003).

5. It generates responder session number $sid_R$=g$^r$ (step 1003).

6. It generates.
u=Hash'($sid_I$, $sid_R$, $sid_C$, id, id', e(y$^r$, y'), "response"),
c=hash(u)+r,
H=Hash($sid_I$, $sid_R$, $sid_C$, id, id', u, u', e(x, y'), "response"), and
K=Hash($sid_I$, $sid_R$, $sid_C$, id', id, u', u, e(x, y'))
(step 1004). In this manner, it generates a cryptotext, hash values, and K.

7. It adds the received starter session number and the generated responder session number to session number SID=($\phi$, $\phi$, $sid_C$, id, id', "response"), and updates session number SID into SID=($sid_I$, $sid_R$, $sid_C$, id, id', "response") (step 1005).

8. It sets K generated in step 1004 as an exchange key (step 1006).

9. It stores K as indicative of an exchange result corresponding to the session number updated in above operation 7, in exchange result list 711 of storage 750 (step 1006).

10. It sends message (id', id, SID, (c, H)) to the companion key exchange apparatus having apparatus number id' through communicating section 714 and network 715 (step 1007).

11. It erases internal state information $\phi$ corresponding to the session number updated in above operation 7, from internal state list 708 of storage 750 (step 1008).

12. It puts an end to the operation sequence, and is in a standby condition waiting for next input data or received data (step 1009).

If the answer to step 902 is No, then key exchange responding section 710 reads session number SID' of received message (id, id', SID', (c', H')) and checks if it is of format SID'=($sid_I$, $sid_R$, $sid_C$, id', id, "response") or not (step 906). If it is of format SID'=($sid_I$, $sid_R$, $sid_C$, id', id, "response"), then key exchange responding section 710 judges that it has received a response message from the companion key exchange apparatus in response to a message that key exchange preparing section 709 has sent, as a starter, to the companion key exchange apparatus, and operates as follows:

1. It confirms that the destination to which the message is sent is in agreement with number id of its own apparatus. If not in agreement, then it puts an end to the operation sequence, and is in a standby condition waiting for next input data or received data.

2. It checks if the internal state information corresponding to session number SID=(sid$_I$, φ, sid$_C$, id, id', "start") is present in internal state list 708 of storage 750 or not (step 907). If the processing of step 805 described with reference to FIG. 8 has been carried out, then the internal state information has been stored in internal state list 708. If the internal state information corresponding to the session number is not present, then it puts an end to the operation sequence, and is in a standby condition waiting for next input data or received data (step 909).

If the internal state information is present in step 907, then control goes to the flowchart shown in FIG. 10B, and key exchange responding section 710 operates as follows:

3. It reads corresponding internal state information μ that is stored (step 1021). It sets y'=Hash'(g, m, id'), h'=sid$_R$, and then generates
u'=Hash'(sid$_I$, sid$_C$, id', id, e(h', x), "response"), and
r'=c'−Hash(u'), thereby decrypting the cryptotext (step 1021). Then, it confirms that h'=g$^{r'}$, H'=Hash(sid$_I$, sid$_R$, sid$_C$, id', id, u', u, e(x, y'), "start") is satisfied (step 1022). If the above equation is not satisfied, then key exchange responding section 710 is in a standby condition waiting for next input data or received data (step 1026).

4. It adds the received starter session number to session number SID=(sid$_I$, φ, sid$_C$, id, id', "start"), and updates session number SID into SID=(sid$_I$, sid$_R$, sid$_C$, id, id', "start") (step 1023).

5. It generates exchange key K=Hash(sid$_I$, sid$_R$, sid$_C$, id, id', u, u', e(x, y'), "key") (step 1024).

6. It stores K as indicative of an exchange result corresponding to the session number updated in above operation 4, in exchange result list 711 of storage 750 (step 1024).

7. It erases internal state information u corresponding to the session number updated in above operation 4, from internal state list 708 of storage 750 (step 1025).

8. It puts an end to the operation sequence, and is in a standby condition waiting for next input data or received data (step 1026).

If the key generated as described above becomes no longer necessary, the key is expired in the manner described below. A command for expiring the key may be entered through the input section 707 or received through network 715 and communicating section 714. The expiration of the key will be described below with reference to the flowchart shown in FIG. 6.

When key expiring section 711 is supplied with a key expiring command and session number SID for identifying a key to be expired (step 601), it operates as follows:

1. It determines whether the exchange result of a session number which is in agreement with session number SID is held in exchange result list 711 of storage 750 or not (step 602). If the corresponding exchange result is held, then the exchange result and session number SID are erased (step 603).

2. It puts an end to the operation sequence, and is in a standby condition waiting for next input data or received data (step 604).

When the key exchange apparatus according to the present exemplary embodiment exchanges messages with another key exchange apparatus for a key exchange process, it may also have only two communication sessions regardless of whether it is a starter or a responder. The key exchange apparatus also has a denial possibility, as described with respect to the first exemplary embodiment.

The key exchange apparatus, which serves as a starter apparatus for a key exchange process, does not require the public key y' of the companion apparatus because it can use an arbitrary character string such as a mail address, a url, or the like inherent with the companion apparatus, as apparatus number id' for identifying the companion apparatus. At the time the communicative companion is identified, all the information of the companion required for the generation of a session number and a message is available for use.

3rd Exemplary Embodiment

A key exchange apparatus according to the present exemplary embodiment is identical in configuration to the key exchange apparatus according to the first exemplary embodiment, but is different in operation therefrom. Details of the configuration of the present exemplary embodiment will not be described below, and operation of the key exchange apparatus according to the present exemplary embodiment will be described in detail below.

As described above with reference to FIG. 3 for the first exemplary embodiment, key exchange preparing section 209 of key exchange apparatus 200 is supplied with command 201, initial session number 202, random number 203, own private key 204, own public key 205, and companion public key 206 through input section 215 (step 301). As with the first exemplary embodiment, it is assumed that initial session number 202 is represented by sid$_C$, own private key 204 by x ∈ Z/qZ, own public key 205 by y=g$^x$, and companion public key 206 by y'.

Key exchange preparing section 209 determines whether command 201 indicates "key exchange start" or not (step 302). If command 201 indicates "key exchange start", then key exchange preparing section 209 operates as follows:

1. It generates r ∈ Z/qZ from random number 203 (step 303).

2. It generates starter session number sid$_I$=g$^r$ (step 303).

3. It generates hash value H=Hash(sid$_I$, sid$_C$, y, y', y'$^r$, "start") (step 304).

4. It generates session number SID as SID=(sid$_I$, φ, sid$_C$, y, y', "start") (step 305).

5. It stores r as indicative of internal state information corresponding to the session number determined by above operation 4, in internal state list 207 of storage 205 (step 305).

6. It sends message (y', y, SID, H) to the companion key exchange apparatus with public key y' through communicating section 212 and network 213 (step 306).

7. It puts an end to the operation sequence, and is in a standby condition waiting for next input data or received data (step 307).

If command 201 does not indicate "key exchange start" in step 302 shown in FIG. 3, then key exchange preparing section 209 determines whether command 201 indicates "key exchange response" or not (step 308). If command 201 indicates "key exchange response", then key exchange preparing section 209 operates as follows:

1. It generates session number SID as SID=(φ, φ, sid$_C$, y, y', "response") (step 309). In this session number, the starter session number and the responder session number are nil.

2. It stores φ as indicative of internal state information corresponding to the session number determined by above operation 1, in internal state list 207 of storage 250 (step 309).

3. It puts an end to the operation sequence, and is in a standby condition waiting for next input data or received data (step 310). It operates similarly if command 201 does not indicate "key exchange response" in step 308.

As described above, key exchange preparing section 209 carries out steps 303 through 306 if it is a starter, and carries out step 309 if the companion is a starter and it is a responder.

Figure 12A:
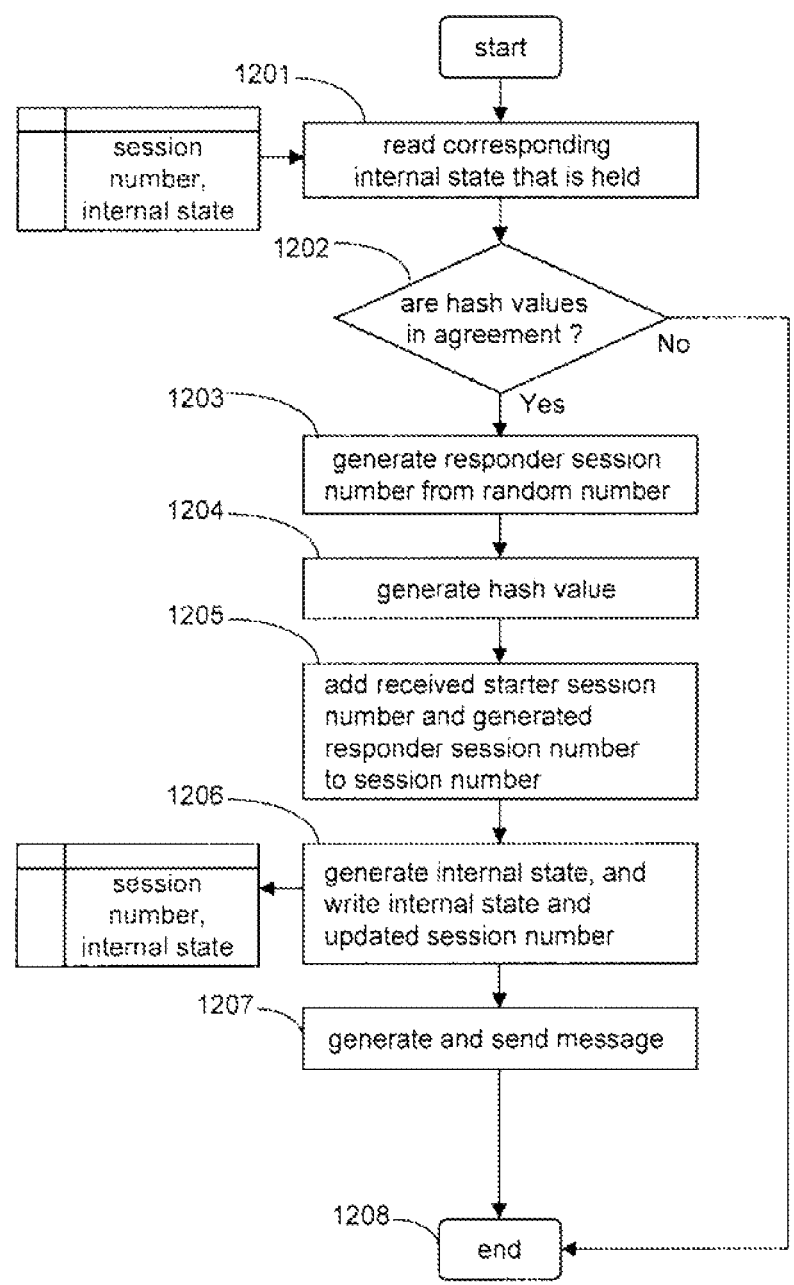
FIG. 12A is a flowchart of an operation sequence of process 5 shown in FIG. 11.
Figure 12B:
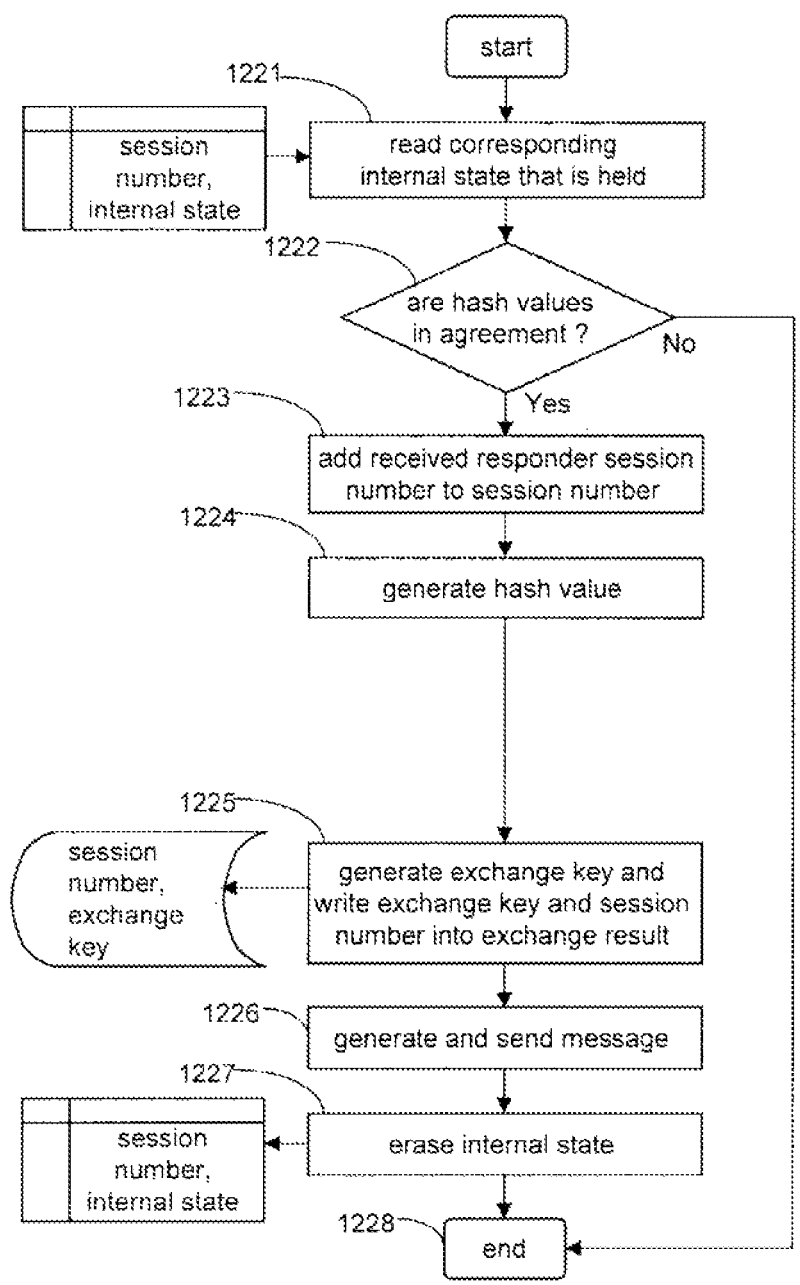
FIG. 12B is a flowchart of an operation sequence of process 6 shown in FIG. 11.
Figure 13:
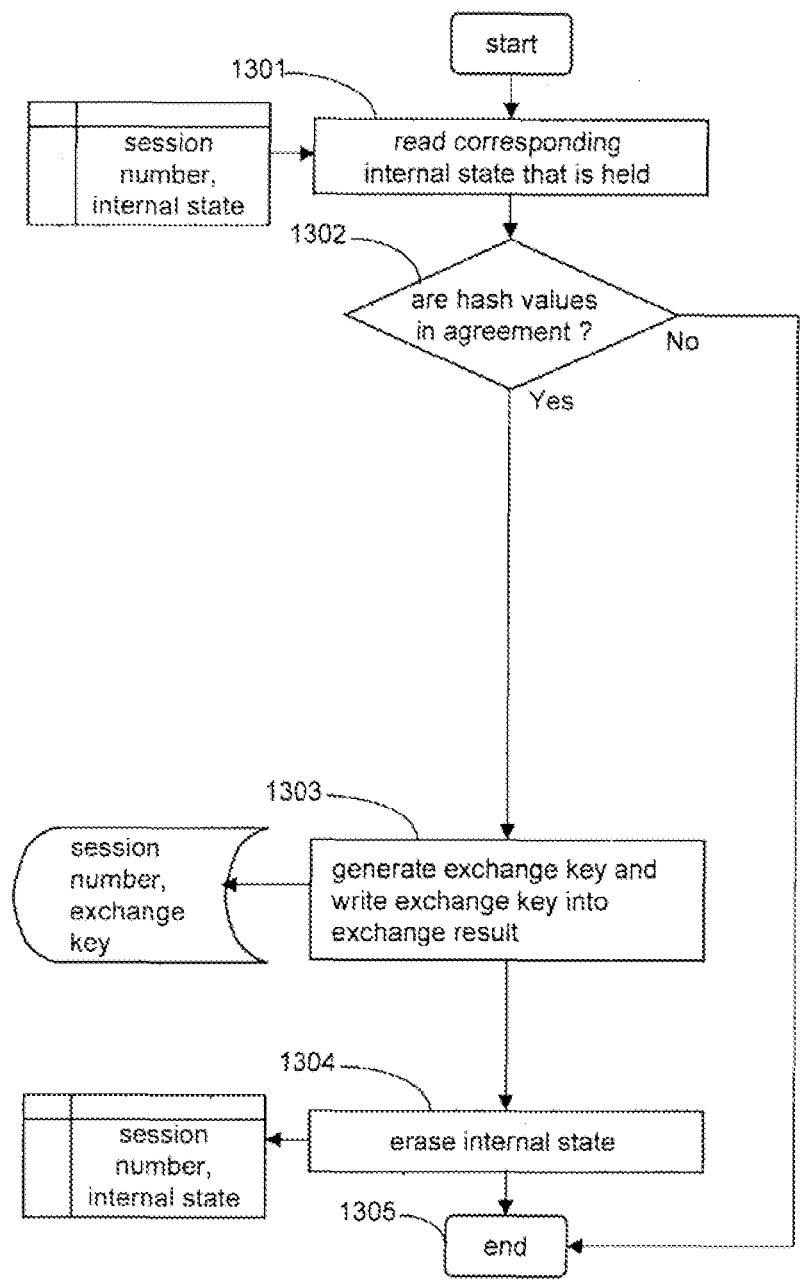
FIG. 13 is a flowchart of an operation sequence of process 7 shown in FIG. 11.

Then, operation of key exchange responding section 210 will be described below. FIG. 11 is a flowchart of an operation sequence of the key exchange responding section. FIG. 12A is a flowchart of an operation sequence of process 5 shown in FIG. 11, and FIG. 12B is a flowchart of an operation sequence of process 6 shown in FIG. 11. FIG. 13 is a flowchart of an operation sequence of process 7 shown in FIG. 11.

The operation sequence of key exchange responding section 210 includes an operation sequence when it receives a message from the companion while it is a responder and the companion is a starter and an operation sequence when it receives a message from the companion while it is a starter and the companion is a responder. These operation sequences will be described successively.

Key exchange responding section 210 of key exchange apparatus 200 receives message (y, y', SID', H') from the companion key exchange apparatus through network 213 and communicating section 212 (step 1101). Key exchange responding section 210 then determines whether session number SID' is of format SID'=($sid_I$, φ, $sid_C$, y', y, "start") or not (step 1102).

Message (y, y', SID', H') has been generated by the companion key exchange apparatus having public key y' in the same manner as the process described with reference to FIG. 3. The session number and the hash value which are included in this message are indicated respectively by SID' and H'.

If the answer to step 1102 is Yes, then key exchange responding section 210 acts as a responder and operates as follows:

1. It confirms that the destination to which the message is sent is in agreement with public key y of its own apparatus. If not in agreement, then it puts an end to the operation sequence, and is in a standby condition waiting for next input data or received data.

2. It checks if the internal state information corresponding to session number SID (φ, φ, $sid_C$, y, y', "response") is present in internal state list 207 of storage 250 or not (step 1103). If the processing of step 309 described with reference to FIG. 3 has been carried out, then the internal state information has been stored in internal state list 207. If the internal state information corresponding to the session number is not present, then it puts an end to the operation sequence, and is in a standby condition waiting for next input data or received data (step 1105).

If the internal state information is present in step 1103, then control goes to the flowchart shown in FIG. 12A, and key exchange responding section 210 operates as follows:

3. It reads corresponding internal state information φ that is stored (step 1201). It sets h'=$sid_I$, then reads H' included in the received message, and confirms that H'=Hash($sid_I$, $sid_C$, y', y, $h'^X$, "start") is satisfied (step 1202). If the above equation is not satisfied, then key exchange responding section 210 puts an end to the operation sequence, and is in a standby condition waiting for next input data or received data (step 1208).

4. It generates r ∈ Z/qZ from a random number (step 1203).

5. It generates responder session number $sid_R$=$g^r$ (step 1203).

6. It generates hash value H=Hash($sid_I$, $sid_R$, $sid_C$, y, y', h'$^r$, h'$^x$, y'$^r$, "response") (step 1204).

7. It adds the received starter session number and the generated responder session number to session number SID=(φ, φ, $sid_C$, y, y', "response"), and updates session number SID into SID=($sid_R$, $sid_C$, y, y', "response") (step 1205).

8. It stores (h'$^r$, y'$^r$, h'$^x$) as indicative of internal state information corresponding to the session number updated in above operation 7, in internal state list 207 of storage 250 (step 1206).

9. It sends message (y', y, SID, H) to the companion key exchange apparatus having public key y' through communicating section 212 and network 213 (step 1207).

10. It puts an end to the operation sequence, and is in a standby condition waiting for next input data or received data (step 1208).

If the answer to step 1102 is No, then key exchange responding section 210 reads session number SID' of received message (y, y', SID', H') and checks if it is of format SID'=($sid_I$, $sid_R$, $sid_C$, y', y, character string data) or not (step 1106). If it is of format SID'=($sid_I$, $sid_R$, $sid_C$, y', y, character string data), then it determines whether the character string data include "response" or not (step 1107).

If the character string data include "response" in step 1107, then key exchange responding section 210 judges that it has received a response message from the companion key exchange apparatus in response to a message that key exchange preparing section 209 has sent, as a starter, to the companion key exchange apparatus, and operates as follows:

1. It confirms that the destination to which the message is sent is in agreement with public key y of its own apparatus. If not in agreement, then it puts an end to the operation sequence, and is in a standby condition waiting for next input data or received data.

2. It checks if the internal state information corresponding to session number SID ($sid_I$, φ, $sid_C$, y, y', "start") is present in internal state list 207 of storage 250 or not (step 1108). If the processing of step 305 described with reference to FIG. 3 has been carried out, then the internal state information has been stored in internal state list 207. If the internal state information corresponding to the session number is not present, then it puts an end to the operation sequence, and is in a standby condition waiting for next input data or received data (step 1110).

3. If the internal state information corresponding to the session number is present in step 1108, then control goes to the flowchart shown in FIG. 12B, and key exchange responding section 210 reads corresponding internal state information r which is held (step 1221). Then, it sets h'=$sid_R$, reads H' from the received message, and confirms that H'=Hash($sid_I$, $sid_R$, $sid_C$, y', y, h'$^r$, y'$^x$, h'$^x$, "response") is satisfied (step 1222). If the above equation is not satisfied, then key exchange responding section 210 is in a standby condition waiting for next input data or received data (step 1228).

4. It adds the received responder session number to session number SID=($sid_I$, φ, $sid_C$, y, y', "start") and updates session number SID into SID=($sid_I$, $sid_R$, $sid_C$, y, y', "start") (step 1223).

5. It generates hash value H''=($sid_I$, $sid_R$, $sid_C$, y, y', h'$^r$, y'$^x$, h'$^x$, "start") (step 1224), and generates exchange key K=Hash ($sid_I$, $sid_R$, $sid_C$, y, y', h'$^r$, y'$^r$, h'$^r$, (step 1225).

6. It stores K as indicative of an exchange result corresponding to the session number updated in above operation 4, in exchange result list 208 of storage 250 (step 1225).

7. It sends message (y', y, SID, H'') to the companion key exchange apparatus having public key y' through communicating section 212 and network 213 (step 1226).

8. It erases internal state information r corresponding to the session number updated in above operation 4 (step 1227).

9. It puts an end to the operation sequence, and is in a standby condition waiting for next input data or received data (step 1228).

If the character string data represent "start" in step 1107, then the message corresponds to the message sent from the starter key exchange apparatus to the responder key exchange apparatus in step 1226. Although either one of two messages received from the starter includes "start" in the character string data of SID', it is possible to determine either one of the messages based on whether the responder session number is included in SID' or not. If the responder session number is included, then the message corresponds to the second message sent from the starter.

Key exchange responding section 210 receives message (y, y', SID', H") (step 1101), and reads SID' of the message. If it is of format SID'=(sid$_I$, sid$_R$, sid$_C$, y', y, "start") (step 1107), then key exchange responding section 210 judges that the message is the second message from the starter, and operates as follows:

1. It confirms that the destination to which the message is sent is in agreement with public key y of its own apparatus. If not in agreement, then it puts an end to the operation sequence, and is in a standby condition waiting for next input data or received data.

2. It checks if the internal state information corresponding to session number SID (sid$_I$, sid$_R$, sid$_C$, y, y', "response") is present in internal state list 207 of storage 250 or not (step 1112). If the processing of step 1206 described with reference to FIG. 12A has been carried out, then the internal state information has been stored in internal state list 207. If the internal state information corresponding to the session number is not present, then it puts an end to the operation sequence, and is in a standby condition waiting for next input data or received data (step 1114).

If the internal state information is present in step 1112, then control goes to the flowchart shown in FIG. 13, and key exchange responding section 210 operates as follows:

3. It reads corresponding internal state information (h'$^r$), y'$^r$, h'$^{rX}$) that is stored (step 1301). It sets h'=sid$_I$, then reads H" included in the received message, and confirms that H"=Hash (sid$_I$, sid$_C$, y', y, h'$^r$, h'$^{rX}$, y'$^r$, "start") is satisfied (step 1302). If the above equation is not satisfied, then key exchange responding section 210 puts an end to the operation sequence, and is in a standby condition waiting for next input data or received data (step 1305).

4. It generates exchange key K=Hash(sid$_I$, sid$_R$, sid$_C$, y, y', h'$^r$, h'$^{rX}$, "key") (step 1303).

5. It stores K as indicative of an exchange result corresponding to the session number updated in step 1205, in exchange result list 208 of storage 250 (step 1303).

6. It erases internal state information corresponding to the session number updated in step 1205, from internal state list 207 of storage 250 (step 1304).

7. It puts an end to the operation sequence, and is in a standby condition waiting for next input data or received data (step 1305).

Operation of key expiring section 211 is the same as the process described with reference to FIG. 6 for the first exemplary embodiment, and will not be described in detail below.

Although the key exchange apparatus according to the present exemplary embodiment performs three message communication sessions, the other details of the key exchange apparatus are effective to provide the same advantages as those of the first exemplary embodiment. The key exchange apparatus according to the present exemplary embodiment does not require arithmetic operations under high loads such as an encrypting operation. Furthermore, the number of parameters used to calculate hash values for authentication is one smaller than with the first exemplary embodiment. Therefore, the key exchange apparatus according to the present exemplary embodiment is subject to lower calculation loads than with the first exemplary embodiment.

4th Exemplary Embodiment

A key exchange apparatus according to the present exemplary embodiment is identical in configuration to the key exchange apparatus according to the second exemplary embodiment, but is different in operation therefrom. Details of the configuration of the present exemplary embodiment will not be described below, and operation of the key exchange apparatus according to the present exemplary embodiment will be described in detail below.

As described above with reference to FIG. 8 for the second exemplary embodiment, key exchange preparing section 709 of key exchange apparatus 700 is supplied with command 701, initial session number 702, random number 703, own private key 704, own apparatus number 705, companion apparatus number 706, and system key 716 through input section 707 (step 801). It is assumed that initial session number 702 is represented by sid$_C$, own private key 704 by x ∈ G, own apparatus number 705 by id, companion apparatus number 706 by id', and system key 716 by m ∈ G.

Key exchange preparing section 709 determines whether command 701 indicates "key exchange start" or not (step 802). If command 701 indicates "key exchange start", then key exchange preparing section 709 operates as follows: It is assumed that if s satisfies m=g$^S$, then x=Hash(g, m, id)$^S$.

1. It generates r ∈ Z/qZ from a random number (step 803).
2. It generates starter session number sid$_I$=g$^r$ (step 803).
3. It generates, as a hash value and a cryptotext:
  y'=Hash'(g, m, id'),
  u=Hash'(sid$_I$, sid$_C$, id, id', e(y$^r$, y'), "start"),
  c=Hash(u)+r,
  H=Hash(sid$_I$, sid$_C$, id, id', u, "start") (step 804).
4. It generates session number SID as SID=(sid$_I$, φ, sid$_C$, id, id', "start") (step 805).
5. It stores u as indicative of internal state information corresponding to the session number determined by above operation 4, in internal state list 708 of storage 705 (step 805).
6. It sends message (id', id, SID, (c, H)) to the companion key exchange apparatus with apparatus number id' through communicating section 714 and network 715 (step 806).
7. It puts an end to the operation sequence, and is in a standby condition waiting for next input data or received data (step 807).

If command 701 does not indicate "key exchange start" in step 802 shown in FIG. 8, then key exchange preparing section 709 determines whether command 701 indicates "key exchange response" or not (step 808). If command 701 indicates "key exchange response", then key exchange preparing section 709 operates as follows:

1. It generates session number SID as SID=(φ, φ, sid$_C$, id, id', "response") (step 809).
2. It stores φ as indicative of internal state information corresponding to the session number determined by above operation 1, in internal state list 708 of storage 750 (step 809).
3. It puts an end to the operation sequence, and is in a standby condition waiting for next input data or received data (step 810). It operates similarly if command 701 does not indicate "key exchange response" in step 808.

As described above, key exchange preparing section 709 carries out steps 803 through 806 if it is a starter, and carries out step 809 if the companion is a starter and it is a responder.

Figure 15A:
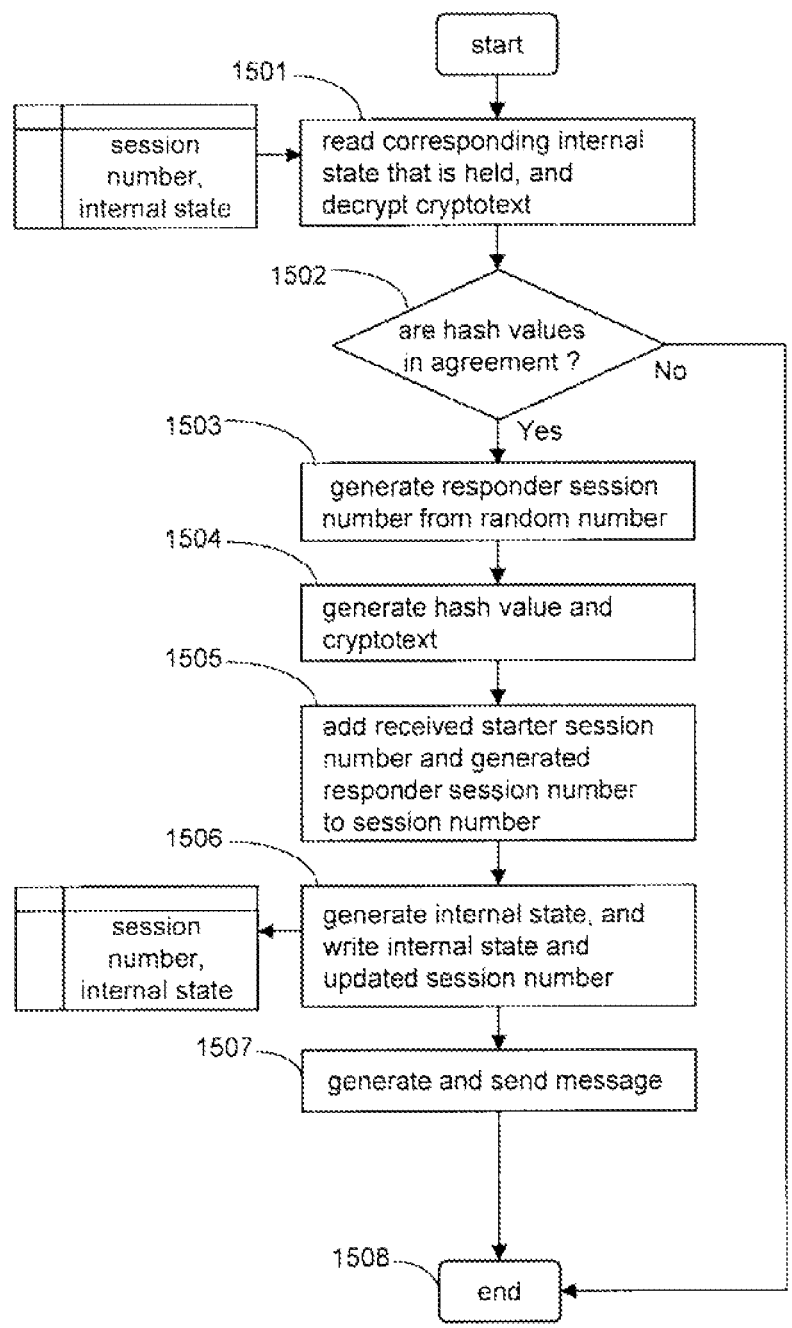
FIG. 15A is a flowchart of an operation sequence of process 8 shown in FIG. 14.
Figure 15B:
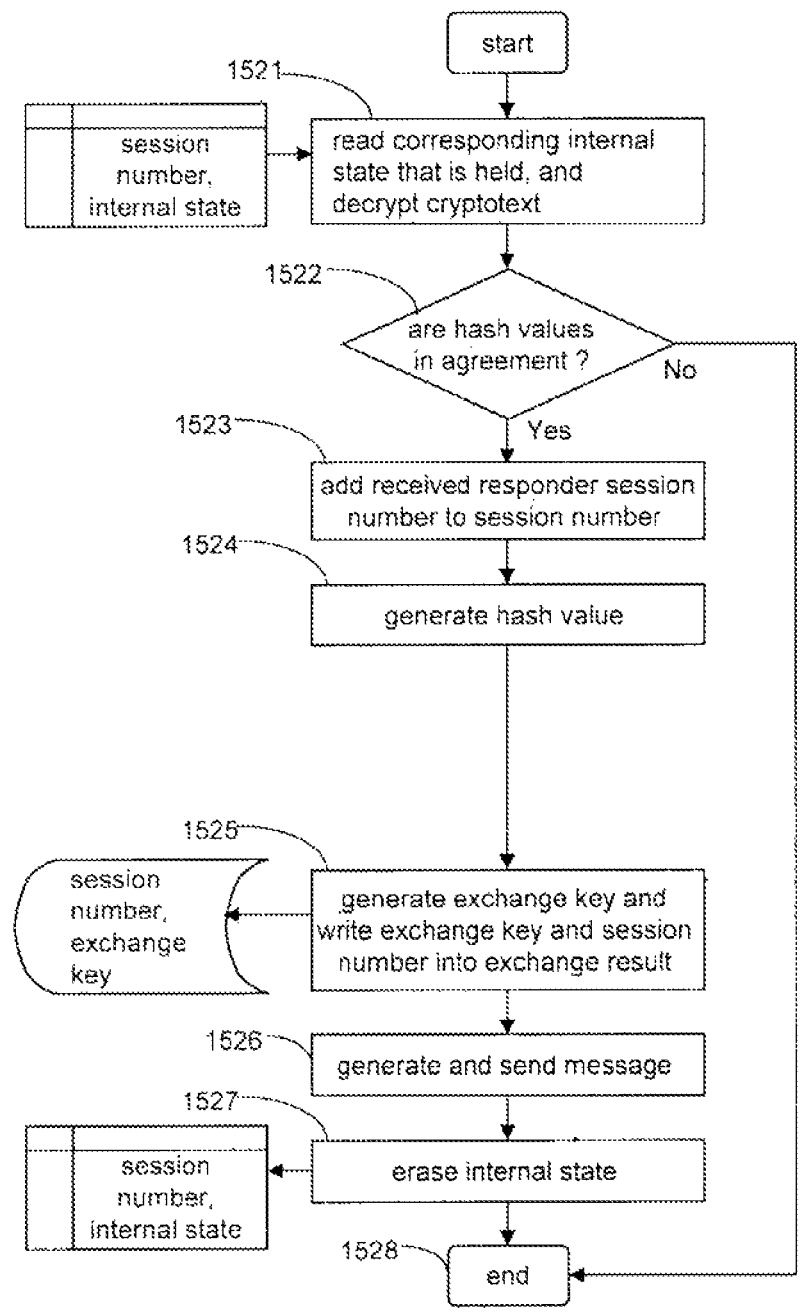
FIG. 15B is a flowchart of an operation sequence of process 9 shown in FIG. 14.
Figure 16:
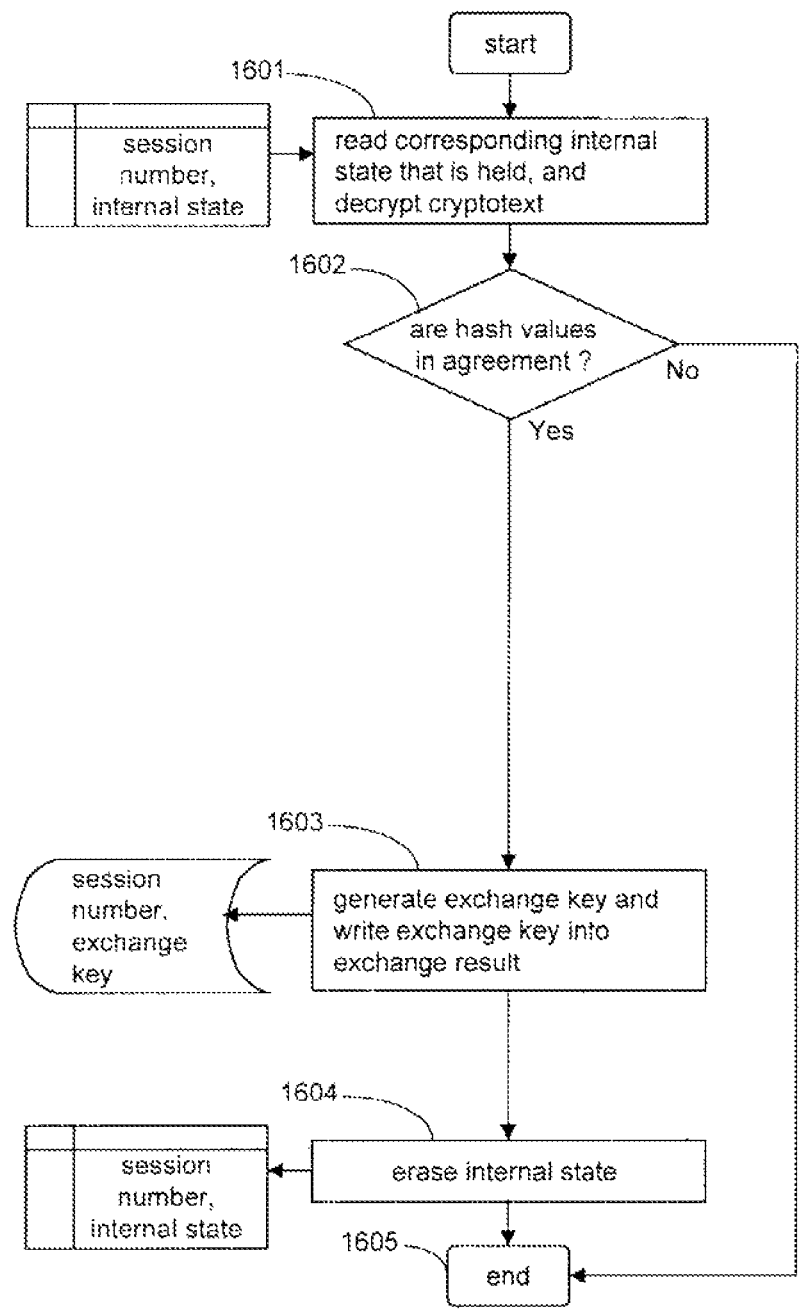
FIG. 16 is a flowchart of an operation sequence of process 10 shown in FIG. 14.

Then, operation of key exchange responding section 710 will be described below. FIG. 14 is a flowchart of an operation sequence of the key exchange responding section. FIG. 15A is a flowchart of an operation sequence of process 8 shown in FIG. 14, and FIG. 15B is a flowchart of an operation sequence of process 10 shown in FIG. 14. FIG. 16 is a flowchart of an operation sequence of process 10 shown in FIG. 14.

The operation sequence of key exchange responding section 710 includes an operation sequence when it receives a message from the companion while it is a responder and the companion is a starter and an operation sequence when it receives a message from the companion while it is a starter and the companion is a responder. These operation sequences will be described successively.

Key exchange responding section 710 of key exchange apparatus 700 receives message (id, id', SID', (c', H')) from the companion key exchange apparatus through network 715 and communicating section 714 (step 1401). Key exchange responding section 710 then determines whether session number SID' is of format SID'=($sid_I$, φ, $sid_C$, id', id, "start") or not (step 1402).

Message (id, id', SID', (c', H')) has been generated by the companion key exchange apparatus having apparatus number id' in the same manner as the process described with reference to FIG. 8. The session number, the cryptotext, and the hash value which are included in this message are indicated respectively by SID', c', and H'.

If the answer to step 1402 is Yes, then key exchange responding section 710 acts as a responder and operates as follows:

1. It confirms that the destination to which the message is sent is in agreement with number id of its own apparatus. If not in agreement, then it puts an end to the operation sequence, waiting for next input data or received data.

2. It checks if the internal state information corresponding to session number SID (φ, φ, $sid_C$, id, id', "response") is present in internal state list 708 of storage 750 or not (step 1403). If the processing of step 809 described with reference to FIG. 8 has been carried out, then the internal state information has been stored in internal state list 708. If the internal state information corresponding to the session number is not present, then it puts an end to the operation sequence, and is in a standby condition waiting for next input data or received data (step 1405).

If the internal state information is present in step 1403, then control goes to the flowchart shown in FIG. 15A, and key exchange responding section 710 operates as follows:

3. It reads corresponding internal state information that is stored (step 1501). It sets y'=Hash(g, m, id'), h'=$sid_I$, and then generates
u'=Hash'($sid_I$, $sid_C$, id', id, e(h', x), "start"), and
r'=c'−Hash(u'), thereby decrypting the cryptotext (step 1501). Then, it confirms that h'=H'=Hash($sid_I$, $sid_C$, id', id, u', "start") is satisfied (step 1502). If the above equation is not satisfied, then key exchange responding section 710 puts an end to the operation sequence, and is in a standby condition waiting for next input data or received data (step 1508).

4. It generates r ∈ Z/qZ from a random number (step 1503).

5. It generates responder session number $sid_R$=$g^r$ (step 1503).

6. It generates
u=Hash'($sid_I$, $sid_R$, $sid_C$, id, id', e(y^r, y'), "response"),
c=hash(u)+r, and
H=Hash($sid_I$, $sid_R$, $sid_C$, id, id', u, u', "response")
(step 1504). In this manner, it generates a cryptotext and hash values.

7. It adds the received starter session number and the generated responder session number to session number SID=(φ, φ, $sid_C$, id, id', "response"), and updates session number SID into SID=($sid_I$, $sid_R$, $sid_C$, id, id', "response") (step 1505).

8. It stores (u, u') as indicative of an exchange result corresponding to the session number updated in above operation 7, in exchange result list 711 of storage 750 (step 1506).

9. It sends message (id', id, SID, (c, H)) to the companion key exchange apparatus having apparatus number id' through communicating section 714, and network 715 (step 1507).

10. It puts an end to the operation sequence, and is in a standby condition waiting for next input data or received data (step 1508).

If the answer to step 1402 is No, then key exchange responding section 710 reads session number SID' of received message (id, id', SID', (c', H')) and checks if it is of format SID'=($sid_I$, $sid_R$, $sid_C$, id', id, "character string data") or not (step 1406). If it is of format SID'=($sid_I$, $sid_R$, $sid_C$, id', id, "character string data"), then key exchange responding section 710 determines whether the character string data include "response" or not (step 1407).

If the character string data include "response" in step 1407, then key exchange responding section 710 judges that it has received a response message from the companion key exchange apparatus in response to a message that key exchange preparing section 709 has sent, as a starter, to the companion key exchange apparatus, and operates as follows:

1. It confirms that the destination to which the message is sent is in agreement with number id of its own apparatus. If not in agreement, then it puts an end to the operation sequence, and is in a standby condition waiting for next input data or received data.

2. It checks if the internal state information corresponding to session number SID ($sid_I$, φ, $sid_C$, id, id', "start") is present in internal state list 708 of storage 750 or not (step 1408). If the processing of step 805 described with reference to FIG. 8 has been carried out, then the internal state information has been stored in internal state list 708. If the internal state information corresponding to the session number is not present, then it puts an end to the operation sequence, and is in a standby condition waiting for next input data or received data (step 1410).

If the internal state information is present in step 1408, then control goes to the flowchart shown in FIG. 15B, and key exchange responding section 710 operates as follows:

3. It reads corresponding internal state information u which is held (step 1521). Then, it sets y'=Hash'(g, m, id')h', h'=$sid_R$, and then generates
u'=Hash'($sid_I$, $sid_R$, $sid_C$, id', id, e(h', x), "response"), and
r'=c'−Hash(u'), thereby decrypting the cryptotext (step 1521). Then, it confirms that h'=$g^r$, H'=Hash($sid_I$, $sid_R$, $sid_C$, id', id, u', u, "start") is satisfied (step 1522). If the above equation is not satisfied, then key exchange responding section 710 is in a standby condition waiting for next input data or received data (step 1528).

4. It adds the received responder session number to session number SID=($sid_I$, φ, $sid_C$, id, id', "start") and updates session number SID into SID=$sid_R$, $sid_C$, id, id', "start") (step 1523).

5. It generates hash value H''=($sid_I$, $sid_R$, $sid_C$, id, id', u, u', "start") (step 1524), and generates exchange key K=Hash ($sid_I$, $sid_R$, $sid_C$, id, id', u, u', "key") (step 1525).

6. It stores K as indicative of an exchange result corresponding to the session number updated in above operation 4, in exchange result list 711 of storage 750 (step 1525).

7. It sends message (id', id, SID, H'') to the companion key exchange apparatus having apparatus number id' through communicating section 714 and network 715 (step 1526).

8. It erases internal state information u corresponding to the session number updated in above operation 4 from internal state list 708 of storage 750 (step 1527).

9. It puts an end to the operation sequence, and is in a standby condition waiting for next input data or received data (step 1528).

If the character string data represent "start" in step 1407, then the message corresponds to the message sent from the starter key exchange apparatus to the responder key exchange apparatus in step 1526. Although either one of two messages received from the starter includes "start" in the character string data of SID', it is possible to determine either one of the messages based on whether the responder session number is included in SID' or not. If the responder session number is included, then the message corresponds to the second message sent from the starter.

Key exchange responding section 710 receives message (id, id', SID', H") (step 1401), and reads SID' of the message. If it is of format SID'=($sid_I$, $sid_R$, $sid_C$, id', id, "start") (step 1407), then key exchange responding section 710 judges that the message is the second message from the starter, and operates as follows:

1. It confirms that the destination to which the message is sent is in agreement with number id of its own apparatus. If not in agreement, then it puts an end to the operation sequence, and is in a standby condition waiting for next input data or received data.

2. It checks if the internal state information corresponding to session number SID=($sid_I$, $sid_R$, $sid_C$, id, id', "response") is present in internal state list 708 of storage 750 or not (step 1412). If the processing of step 1506 described with reference to FIG. 15A has been carried out, then the internal state information has been stored in internal state list 708. If the internal state information corresponding to the session number is not present, then it puts an end to the operation sequence, and is in a standby condition waiting for next input data or received data (step 1414).

If the internal state information is present in step 1412, then control goes to the flowchart shown in FIG. 16, and key exchange responding section 710 operates as follows:

3. It reads corresponding internal state information (u, u') that is stored (step 1601). It reads H" included in the received message, and confirms that H"=Hash($sid_I$, $sid_R$, $sid_C$, id', id, u', u, "start") is satisfied (step 1602). If the above equation is not satisfied, then key exchange responding section 710 puts an end to the operation sequence, and is in a standby condition waiting for next input data or received data (step 1605).

4. It generates exchange key K=Hash($sid_I$, $sid_R$, $sid_C$, id', id, u', u, "key") (step 1603).

5. It stores K as indicative of an exchange result corresponding to the session number updated in step 1505, in exchange result list 711 of storage 750 (step 1603).

6. It erases internal state information corresponding to the session number updated in step 1505, from internal state list 708 of storage 750 (step 1604).

7. It puts an end to the operation sequence, and is in a standby condition waiting for next input data or received data (step 1605).

Operation of key expiring section 713 is the same as the process described with reference to FIG. 6 for the second exemplary embodiment, and will not be described in detail below.

Although the key exchange apparatus according to the present exemplary embodiment performs three message communication sessions, the other details of the key exchange apparatus are effective to provide the same advantages as those of the second exemplary embodiment. The key exchange apparatus according to the present exemplary embodiment can carry out a key exchange process even if it is not aware of the public key of the companion. Since the number of parameters used to calculate hash values for authentication is one smaller than with the second exemplary embodiment, the key exchange apparatus according to the present exemplary embodiment is subject to lower calculation loads than with the second exemplary embodiment.

5th Exemplary Embodiment

According to the present exemplary embodiment, there is provided a key exchange processing system including a plurality of key exchange apparatus described according to the first through fourth exemplary embodiments. The plural key exchange apparatus of the system according to the present exemplary embodiment are key exchange apparatus according to either one of the first through fourth exemplary embodiments. The configurational and operational details of the key exchange apparatus have been described in each of the first through fourth exemplary embodiments. An exchange between the apparatus will briefly be described below.

A plurality of key exchange apparatus are disposed so as to be able to communicate with each other through a network. Any two of the key exchange apparatus are used as a set of apparatus for performing a key exchange process. If they are apparatus according to the first exemplary embodiment or the third exemplary embodiment, then their public keys are represented by y, y', respectively. If they are apparatus according to the second exemplary embodiment or the fourth exemplary embodiment, then their apparatus numbers are represented by id, id', respectively. The apparatus corresponding to public key y or apparatus number id is referred to as one key exchange apparatus, whereas the apparatus corresponding to public key y' or apparatus number id' as the other key exchange apparatus.

Initial session number $sid_C$ is determined, and one key exchange apparatus is supplied with initial session number side and public key y' or apparatus number id' representative of the companion, together with a key exchange start command. The other key exchange apparatus is supplied with initial session number $sid_C$ and public key y or apparatus number id representative of the companion, together with a key exchange response command.

Subsequently, as described above in each of the first through fourth exemplary embodiments, the apparatus perform data communications such that one of the two apparatus sends a message to the other apparatus through the communicating section and the network, and the other apparatus receives the message through the network and the communicating section. As described above in each of the exemplary embodiments, both the apparatus write exchanged keys in their own exchange results, and put an end to the key exchange process.

When session number SID and a key expiring command are supplied to a key exchange apparatus, the key exchange apparatus erase the exchange result corresponding to session number SID.

In the system according to the present exemplary embodiment, the above key exchange process may be carried out on an arbitrary set of key exchange apparatus. No problem arises if each key exchange apparatus carries out another key exchange process without waiting for the sequence of the key exchange process to be ended.

As described above, each of the key exchange apparatus according to the first and second exemplary embodiments makes it possible to perform a deniable authentication and key exchange process with two communication sessions. Each of the key exchange apparatus according to the second and fourth exemplary embodiments makes it possible to perform a deniable authentication and key exchange process without the need for the public key of the companion. Each of the key exchange apparatus according to the first and third exemplary embodiments makes it possible to perform a deniable authentication and key exchange process without the need for arithmetic operations under high loads such as an encrypting operation. Therefore, the key exchange apparatus according to the present invention perform arithmetic operations and communications under lower loads than with the background art.

If the key exchange method according to the present invention is carried out by an information processing apparatus when the user receives a service through a network such as the Internet, then the user can perform secure communications after being authenticated at the time the user receives the network service from a service provider. Thereafter, the service provider is unable to prove, to others, that the user has received the service. The user is also unable to prove that the service provider has provided the service.

When authenticated communications are performed, it is often possible to prove that the communications have been performed based on authentication data. The key exchange apparatus according to the present invention are free of such proof because the results of communications with the companion apparatus are not left in the history. Consequently, the method carried out by the key exchange apparatus according to the present invention is effective in services which require strong privacy.

The operation of the key exchange apparatus according to the present invention may be written in a program to be executed by a computer, and the key exchange method according to the present invention may be carried out by the computer.

Although the present invention has been described above with respect to the exemplary embodiments, the present invention is not limited to the exemplary embodiments described above. Various changes that can be understood by those skilled in the art can be made in the configurations and details of the present invention within the scope of the invention.

This application is based upon and claims the benefit of priority from Japanese Patent Application No. 2007-035112 filed on Feb. 15, 2007, the content of which is incorporated by reference.

What is claimed is:

1. A key exchange processing system comprising:
a first key exchange apparatus including a first storage and a first CPU executing processes according to a program, for performing a key exchange process with a second key exchange apparatus through a network; and
said second key exchange apparatus including a second storage and a second CPU executing processes according to a program, for performing said key exchange process with said first key exchange apparatus through said network, wherein
when said first CPU is supplied with a random number, a private key, an own public key which is the public key of its own apparatus, a companion public key which is the public key of said second key exchange apparatus, an initial session number, and a start command, said first CPU generates a starter session number which is different from said initial session number by assigning a value generated from said random number to a variable of said own public key, generates a first hash value by using information of said starter session number, said random number, and said private key, generates a first session number including said initial session number, said starter session number, said own public key, and said companion public key, and sends a starter message including said first session number and said first hash value to said second key exchange apparatus;
when said second CPU receives said starter message from said first key exchange apparatus, said second CPU determines whether a second hash value generated using information of said first session number and said first hash value are in agreement with each other or not based on a property of a bilinear mapping, and when the hash values are in agreement with each other, said second CPU generates a responder session number which is different from any one of said initial session number and said starter session number, generates a third hash value using information of a second session number that is generated by adding said responder session number to said first session number, stores said third hash value as a key in said second storage, generates a responder message including said second session number and said third hash value, and sends the responder message to said first key exchange apparatus; and
when said first CPU receives said responder message from said second key exchange apparatus, said first CPU determines whether a fourth hash value generated using information of said second session number and said third hash value are in agreement with each other or not based on a property of a bilinear mapping, and when the hash values are in agreement with each other, said first CPU generates a fifth hash value using information of said second session number, and stores said fifth hash value as a key in said first storage.

2. A key exchange processing system comprising:
a first key exchange apparatus including a first storage and a first CPU executing processes according to a program, for performing a key exchange process with a second key exchange apparatus through a network; and
said second key exchange apparatus including a second storage and a second CPU executing processes according to a program, for performing said key exchange process with said first key exchange apparatus through said network, wherein
when said first CPU is supplied with a random number, a private key, an own public key which is the public key of its own apparatus, a companion public key which is the public key of said second key exchange apparatus, an initial session number, and a start command, said first CPU generates a starter session number which is different from said initial sessions number by assigning a value generated from said random number to a variable of said own public key, generates a first hash value by using information of said starter session number, said random number, and said private key, generates a first session number including said initial session number, said starter session number, said own public key, and said companion public key, and sends a first starter message including said first session number and said first hash value to said second key exchange apparatus;
when said second CPU receives said first starter message from said first key exchange apparatus, said second CPU determines whether a second hash value generated using information of said first session number and said first hash value are in agreement with each other or not based on a property of a bilinear mapping, and when the hash values are in agreement with each other, said second CPU generates a responder session number which is different from any one of said initial session number and said starter session number, generates a third hash value using information of a second session number that is generated by adding said responder session number to said first session number, stores an arithmetic result included in said third hash value in said second storage, generates a responder message including said second session number and said third hash value, and sends the responder message to said first key exchange apparatus;
when said first CPU receives said responder message from said second key exchange apparatus, said first CPU determines whether a fourth hash value generated using information of said second session number and said third hash value are in agreement with each other or not based on a property of a bilinear mapping, and when the hash values are in agreement with each other, said first CPU generates a fifth hash value using information of said second session number, stores said fifth hash value as a key in said first storage, and sends a second starter message including said second session number and said fifth hash value to said second key exchange apparatus; and when said second CPU receives said second starter message from said first key exchange apparatus, said second CPU determines whether a sixth hash value generated using information of said second session number and said fifth hash value are in agreement with each other or not based on a property of a bilinear mapping, and when the hash values are in agreement with each other, said second CPU generates a sixth hash value using said arithmetic result and information of said second session number, and stores said sixth hash value as a key in said second storage.

3. A key exchange processing system comprising:

a first key exchange apparatus including a first storage and a first CPU executing processes according to a program, for performing a key exchange process with a second key exchange apparatus through a network; and said second key exchange apparatus including a second storage and a second CPU executing processes according to a program, for performing said key exchange process with said first key exchange apparatus through said network, wherein when said first CPU is supplied with a random number, a first private key, an own apparatus number which is the identifier of its own apparatus, a companion apparatus number which is the identifier key of said second key exchange apparatus, an initial session number, and a start command, said first CPU generates a starter session number which is different from said initial session number by assigning a value generated from said random number to a variable of said own public key, generates a first cryptotext using information of said starter session number and said random number, generates a first hash value by using information of said starter session number, said random number, and said first private key, generates a first session number including said initial session number, said starter session number, said own apparatus number, and said companion apparatus number, and sends a starter message including said first session number, said first cryptotext, and said first hash value to said second key exchange apparatus;

when said second CPU receives said starter message from said first key exchange apparatus, said second CPU decrypts said first cryptotext using information of said first session number and a second private key, generates a second hash value including decrypted result, determines whether the second hash value and said first hash value are in agreement with each other or not based on a property of a bilinear mapping, and when the hash values are in agreement with each other, said second CPU generates a responder session number which is different from any one of said initial session number and said starter session number, generates a second session number by adding said responder session number to said first session number, generates a second cryptotext using information of said second session number and said random number, generates a third hash value including information of said second session number and said second private key, stores said third hash value as a key in said second storage, and sends a responder message including said second session number, said second cryptotext, and said third hash value to said first key exchange apparatus; and when said first CPU receives said responder message from said second key exchange apparatus, said first CPU decrypts said second cryptotext using information of said second session number and said first private key, generates a fourth hash value including decrypted result, determines whether the fourth hash value and said third hash value are in agreement with each other or not based on a property of a bilinear mapping, and when the hash values are in agreement with each other, said first CPU generates a fifth hash value including information of said second session number and said first private key, and stores said fifth hash value as a key in said first storage.

4. A key exchange processing system comprising:

a first key exchange apparatus including a first storage and a first CPU executing processes according to a program, for performing a key exchange process with a second key exchange apparatus through a network; and said second key exchange apparatus including a second storage and a second CPU executing processes according to a program, for performing said key exchange process with said first key exchange apparatus through said network, wherein when said first CPU is supplied with a random number, a first private key, an own apparatus number which is the identifier of its own apparatus, a companion apparatus number which is the identifier key of said second key exchange apparatus, an initial session number, and a start command, said first CPU generates a starter session number which is different from said initial session number by assigning a value generated from said random number to a variable of said own public key, generates a first cryptotext using information of said starter session number and said random number, generates a first hash value by using information of said starter session number, said random number, and said first private key, generates a first session number including said initial session number, said starter session number, said own apparatus number, and said companion apparatus number, and sends a first starter message including said first session number, said first cryptotext, and said first hash value to said second key exchange apparatus;

when said second CPU receives said first starter message from said first key exchange apparatus, said second CPU decrypts said first crypto-text using information of said first session number and a second private key, generates a second hash value including decrypted result, determines whether the second hash value and said first hash value are in agreement with each other or not based on a property of a bilinear mapping, and when the hash values are in agreement with each other, said second CPU generates a responder session number which is different from any one of said initial session number and said starter session number, generates a second session number by adding said responder session number to said first session number, generates a second cryptotext using information of said second session number and said random number, generates a third hash value including information of said second session number and said second private key, stores an arithmetic result included in said third hash value in said second storage, and sends a responder message including said second session number, said second cryptotext, and said third hash value to said first key exchange apparatus;

when said first CPU receives said responder message from said second key exchange apparatus, said first CPU decrypts said second cryptotext using information of said second session number and said first private key, generates a fourth hash value including decrypted result, determines whether the fourth hash value and said third hash value are in agreement with each other or not based on a property of a bilinear mapping, and when the hash values are in agreement with each other, said first CPU generates a fifth hash value including information of said second session number and said first private key, stores said fifth hash value as a key in said first storage, and sends a second starter message including said second session number and said fifth hash value to said second key exchange apparatus; and when said second CPU receives said second starter message from said first key exchange apparatus, said second CPU determines whether a sixth hash value generated using information of said second session number and said fifth hash value are in agreement with each other or not based on a property of a bilinear mapping, and when the hash values are in agreement with each other, said second CPU generates a sixth hash value using said arithmetic result and information of said second session number, and stores said sixth hash value as a key in said second storage.

5. A key exchange method to be carried out by a first CPU of a first key exchange apparatus and a second CPU of a second key exchange apparatus for performing a key exchange process with each other through a network, said first key exchange apparatus including a first storage and said first CPU, and said second key exchange apparatus including a second storage and said second CPU, said key exchange method comprising:

when a random number, a private key, an own public key which is the public key of its own apparatus, a companion public key which is the public key of said second key exchange apparatus, an initial session number, and a start command are supplied to said first key exchange apparatus, generating, by said first CPU, a starter session number which is different from said initial session number by assigning a value generated from said random number to a variable of said own public key, and generating a first hash value by using information of said starter session number, said random number, and said private key;

generating, by said first CPU, a first session number including said initial session number, said starter session number, said own public key, and said companion public key, and sending a starter message including said first session number and said first hash value to said second key exchange apparatus;

when said starter message is received from said first key exchange apparatus, determining, by said second CPU, whether a second hash value generated using information of said first session number and said first hash value are in agreement with each other or not based on a property of a bilinear mapping, and when the hash values are in agreement with each other, and generating a responder session number which is different from any one of said initial session number and said starter session number;

generating, by said second CPU, a third hash value using information of a second session number that is generated by adding said responder session number to said first session number, storing said third hash value as a key in said second storage, generating a responder message including said second session number and said third hash value, and sending the responder message to said first key exchange apparatus; and when said responder message is received from said second key exchange apparatus, determining, by said first CPU, whether a fourth hash value generated using information of said second session number and said third hash value are in agreement with each other or not based on a property of a bilinear mapping, and when the hash values are in agreement with each other, generating a fifth hash value using information of said second session number, and storing said fifth hash value as a key in said first storage.

6. A key exchange method to be carried out by a first CPU of a first key exchange apparatus and a second CPU of a second key exchange apparatus for performing a key exchange process with each other through a network, said first key exchange apparatus including a first storage and said first CPU, and said second key exchange apparatus including a second storage and said second CPU, said key exchange method comprising:

when a random number, a private key, an own public key which is the public key of its own apparatus, a companion public key which is the public key of said second key exchange apparatus, an initial session number, and a start command are supplied to said first key exchange apparatus, generating, by said first CPU, a starter session number which is different from said initial session number by assigning a value generated from said random number to a variable of said own public key, and generating a first hash value by using information of said starter session number, said random number, and said private key;

generating, by said first CPU, a first session number including said initial session number, said starter session number, said own public key, and said companion public key, and sending a first starter message including said first session number and said first hash value to said second key exchange apparatus;

when said first starter message is received from said first key exchange apparatus, determining, by said second CPU, whether a second hash value generated using information of said first session number and said first hash value are in agreement with each other or not based on a property of a bilinear mapping, and when the hash values are in agreement with each other, generating a responder session number which is different from any one of said initial session number and said starter session number;

generating, by said second CPU, a third hash value using information of a second session number that is generated by adding said responder session number to said first session number, storing an arithmetic result included in said third hash value in said second storage, generating a responder message including said second session number and said third hash value, and sending the responder message to said first key exchange apparatus;

when said responder message is received from said second key exchange apparatus, determining, by said first CPU, whether a fourth hash value generated using information of said second session number and said third hash value are in agreement with each other or not based on a property of a bilinear mapping, and when the hash values are in agreement with each other, generating a fifth hash value using information of said second session number, storing said fifth hash value as a key in said first storage, and sending a second starter message including said second session number and said fifth hash value to said second key exchange apparatus; and when said second starter message is received from said first key exchange apparatus, determining, by said second CPU, whether a sixth hash value generated using information of said second session number and said fifth hash value are in agreement with each other or not based on a property of a bilinear mapping, and when the hash values are in agreement with each other, generating a sixth hash value using said arithmetic result and information of said second session number, and storing said sixth hash value as a key in said second storage.

7. A key exchange method to be carried out by a first CPU of a first key exchange apparatus and a second CPU of a second key exchange apparatus for performing a key exchange process with each other through a network, said first key exchange apparatus including a first storage and said first CPU, and said second key exchange apparatus including a second storage and said second CPU, said key exchange method comprising:

when a random number, a first private key, an own apparatus number which is the identifier of said first key exchange apparatus, a companion apparatus number which is the identifier key of said second key exchange apparatus, an initial session number, and a start command are supplied to said first key exchange apparatus, generating, by said first CPU, a starter session number which is different from said initial session number by assigning a value generated from said random number to a variable of said own public key;

generating, by said first CPU, a first cryptotext using information of said starter session number and said random number, generating a first hash value by using information of said starter session number, said random number, and said first private key, generating a first session number including said initial session number, said starter session number, said own apparatus number, and said companion apparatus number, and sending a starter message including said first session number, said first cryptotext, and said first hash value to said second key exchange apparatus;

when said starter message is received from said first key exchange apparatus, decrypting, by said second CPU, said first cryptotext using information of said first session number and a second private key, generating a second hash value including decrypted result, determining whether the second hash value and said first hash value are in agreement with each other or not based on a property of a bilinear mapping, and when the hash values are in agreement with each other, generating a responder session number which is different from any one of said initial session number and said starter session number, generating a second session number by adding said responder session number to said first session number;

generating, by said second CPU, a second cryptotext using information of said second session number and said random number, generating a third hash value including information of said second session number and said second private key, storing said third hash value as a key in said second storage, and sending a responder message including said second session number, said second cryptotext, and said third hash value to said first key exchange apparatus; and when said responder message is received from said second key exchange apparatus, decrypting, by said first CPU, said second cryptotext using information of said second session number and said first private key, generating a fourth hash value including decrypted result, determining whether the fourth hash value and said third hash value are in agreement with each other or not based on a property of a bilinear mapping, and when the hash values are in agreement with each other, generating a fifth hash value including information of said second session number and said first private key, and storing said fifth hash value as a key in said first storage.

8. A key exchange method to be carried out by a first CPU of a first key exchange apparatus and a second CPU of a second key exchange apparatus for performing a key exchange process with each other through a network, said first key exchange apparatus including a first storage and said first CPU, and said second key exchange apparatus including a second storage and said second CPU, said key exchange method comprising:

when a random number, a first private key, an own apparatus number which is the identifier of said first key exchange apparatus, a companion apparatus number which is the identifier key of said second key exchange apparatus, an initial session number, and a start command are supplied to said first key exchange apparatus, generating, by said first CPU, a starter session number which is different from said initial session number by assigning a value generated from said random number to a variable of said own public key;

generating, by said first CPU, a first cryptotext using information of said starter session number and said random number, generating a first hash value by using information of said starter session number, said random number, and said first private key, generating a first session number including said initial session number, said starter session number, said own apparatus number, and said companion apparatus number, and sending a first starter message including said first session number, said first cryptotext, and said first hash value to said second key exchange apparatus;

when said first starter message is received from said first key exchange apparatus, decrypting, by said second CPU, said first cryptotext using information of said first session number and a second private key, generating a second hash value including decrypted result, determining whether the second hash value and said first hash value are in agreement with each other or not based on a property of a bilinear mapping, and when the hash values are in agreement with each other, generating a responder session number which is different from any one of said initial session number and said starter session number, and generating a second session number by adding said responder session number to said first session number;

generating, by said second CPU, a second cryptotext using information of said second session number and said random number, generating a third hash value including in-formation of said second session number and said second private key, storing an arithmetic result included in said third hash value in said second storage, and sending a responder message including said second session number, said second cryptotext, and said third hash value to said first key exchange apparatus;

when said responder message is received from said second key exchange apparatus, decrypting, by said first CPU, said second cryptotext using information of said second session number and said first private key, generating a fourth hash value including decrypted result, determining whether the fourth hash value and said third hash value are in agreement with each other or not based on a property of a bilinear mapping, and when the hash values are in agreement with each other, generating a fifth hash value including information of said second session number and said first private key, storing said fifth hash value as a key in said first storage, and sending a second starter message including said second session number and said fifth hash value to said second key exchange apparatus; and when said second starter message is received from said first key exchange apparatus, determining, by said second CPU, whether a sixth hash value generated using information of said second session number and said fifth hash value are in agreement with each other or not based on a property of a bilinear mapping, and when the hash values are in agreement with each other, generating a sixth hash value using said arithmetic result and information of said second session number, and storing said sixth hash value as a key in said second storage.

* * * * *